United States Patent [19]

Park

[11] E Re. 30,589

[45] Reissued Apr. 28, 1981

[54] METHOD OF EFFECTING FAST TURBINE VALVING FOR IMPROVEMENT OF POWER SYSTEM STABILITY

[75] Inventor: Robert H. Park, Brewster, Mass.

[73] Assignee: Fast Load Control Inc., Freeport, Ill.

[21] Appl. No.: 971,991

[22] Filed: Dec. 18, 1978

Related U.S. Patent Documents

Reissue of:

[64] Patent No.: 3,998,058
Issued: Dec. 21, 1976
Appl. No.: 506,441
Filed: Sep. 16, 1974

[51] Int. Cl.[3] ..... F01K 13/02

[52] U.S. Cl. ..... 60/652; 60/663; 290/40 B; 290/40 C

[58] Field of Search ..... 60/652, 660–667; 290/2, 4, 40 R, 52, 40 B, 40 C

[56] References Cited

U.S. PATENT DOCUMENTS 3,848,138 11/1974 Park ..... 60/664 X

*Primary Examiner*—Allen M. Ostrager

[57] ABSTRACT

As a improved way of effecting fast valving of turbines of power system steam-electric generating units for the purpose of improving the stability of power transmission over transmission circuits to which their generators make connection, when stability is threatened by line faults and certain other stability endangering events, the heretofore employed and/or advocated practice of automatically closing intercept valves at fastest available closing speed in response to a fast valving signal, and thereafter automatically fully reopening them in a matter of seconds, is modified by providing to reopen the valves only partially to and thereafter retain them at a preset partially open position.

For best results the process of what can be termed sustained partial reopening is so effected as to result in its completion within a fraction of a second following the peak of the first forward swing of the generator rotor.

Control valves may be either held open, or automatically fully or partly closed and thereafter fully opened in a preprogrammed manner, or automatically moved to and thereafter held in a partly closed position, by means of a preprogrammed process of repositioning in which the valves may optionally be first fully or partly closed and thereafter partly reopened.

Avoidance of discharge of steam through high pressure safety valves can be had with use of suitably controlled power operated valves that discharge steam to the condenser or to atmosphere.

Where there is an intermediate pressure turbine that is supplied with superheated steam, use of sustained partial control valve closure, if employed, is supplemented by provision *for reduction of* rate of heat release within the steam generator in order to protect the reheater from overheating.

*As a way to restrict increase of reheat pressure of fossil fuel installations, and to minimize increase in the MSR (moisture separator-reheater) pressure of nuclear units, provision is optionally made of normally closed by-pass valves which are arranged to accept reheat or MSR pressure steam and discharge to the condenser in response to either an an increase of reheat or MSR pressure that takes place other than slowly, or to a fast valving signal, or both.*

14 Claims, 6 Drawing Figures

METHOD OF EFFECTING FAST TURBINE VALVING FOR IMPROVEMENT OF POWER SYSTEM STABILITY

Matter enclosed in heavy brackets [ ] appears in the original patent but forms no part of this reissue specification; matter printed in italics indicates the additions made by reissue.

CROSS REFERENCE TO RELATED INVENTIONS

My invention relates in its principal aspect to means for rapidly controlling power flow within power transmission elements of interconnected power systems with a view of favorably affecting the stability of such systems when jeopardized by suddenly occurring adverse events. This patent application is subject matter related to my issued U.S. Pat. Nos. 3,051,842, R26,571, 3,515,893, which has reissued as U.S. Pat. No. R27,842, and U.S. Pat. No. 3,657,552, and is a continuation in part of my copending applications, Ser. No. 244,594 filed Apr. 17, 1972, and Ser. No. 388,619 filed Aug. 15, 1973, which have since issued as U.S. Pat. Nos. 3,849,666 and 3,848,138 respectively.

BACKGROUND OF THE INVENTION

1. Field of Invention

The area of utility of the invention comprises prevention of development of system instability within power systems when threatened by transmission line faults, and certain other system stability endangering events.

The area of method comprises responding to faults, and other events that could endanger system stability, by rapidly initiating preprogrammed processes of a. full or partial fast closure of intercept valves of steam turbine type generator prime movers of power systems, preferably effected within ¼ second, b. subsequent partial reopening of intercept valves, preferably so effected that the valves begin to reopen somewhat in advance of occurrence of the peak and the first forward swing of the generator rotor, and substantially attain planned full extent of partial reopening within a fraction of a second following that peak.

The preprogrammed processes (a) and (b) may optionally be supplemented by other control measures, such as, but not limited to, control valve repositioning and initiation of change in rate of steam generation by steam supply sources, but employment of such supplemental measures is not requisite.

2. Prior Art

This invention is similar to, but can be viewed as, in certain aspects, more basic than that disclosed in the writer's copending application Ser. No. 388,619, now U.S. Pat. No. 3,848,138.

To ensure adequate description of the prior art, the presentation contained in U.S. Pat. No. 3,848,138 is to be regarded as incorporated in this application by reference.

To aid in clarifying how the prior art relates most closely to this application, it has appeared to be desirable to review what was involved in the total process of invention under several headings, as in what follows.

A. INVENTION STATUS OF 1962

In the writer's U.S. Pat. No. 3,051,842 he disclosed the concept of preprogrammed control valve closure followed by partial reopening, and in his U.S. Pat. No. R26,571 added the concept of also rapidly closing and thereafter fully opening intercept valves, but he did not discuss steam generator controls, or the behavior of safety valves.

B. STEAM GENERATOR CONSIDERATIONS

Actually, where what was being dealt with was fossil fuel fired steam generators, of U.S. design, supplying superheated steam to both high and intermediate pressure steam turbines, there was inherent a need to reduce fires, as in a matter of a minute, following a first sustained reduction of high pressure turbine steam acceptance, effected as a result of fast valving, in order to protect the reheater from overheating.

Also during this 1 minute period the high pressure safety valves would be discharging steam to atmosphere, except to the extent that occasion for them to do so would be avoided, or minimized, as a result of the operation of often, but not always, provided, power operated, or so called "powermatic," valves that are arranged to open in response to a rise in steam pressure, and that provide a substitute means of diversion of steam to atmosphere.

Also where, as the writer discovered, typically, provision was not being made for opening intercept valves faster than in a matter of 10 seconds, it could apply that if control valves were not closed sufficiently, reheat pressure safety valves could also lift and discharge steam.

Further, the point came up that when steam discharges through safety valves, particles of metal that would be carried over from the boiler, or the superheater, or the reheater, could cause damage to the seal surfaces, and prevent perfect reseal when the valves reclosed, with the effect that it would be necessary to schedule a unit shutdown to allow repairs, which sort of thing typically would involve considerable expense, in view of the unit being taken out of service, and the requirement of temporarily generating substitute power with older and less efficient machines.

Now, actually, as see reference 69 of the table of references, it appears to be possible to so thoroughly clean boilers, superheaters, and reheaters, that safety valves are seldom if ever damaged, when they discharge steam, which approach is, or has been, successfully used by Ontario-Hydro, as a way to prevent safety valve damage on trip-off to auxiliary load, which they have commonly employed when tripping a unit off the line.

Also, it can be argued, that, at least when fast turbine valving is to be seldom invoked, it would be possible to merely tolerate the damage that lifting of safety valves induces, which, it may be noted, is the policy that applies at the Four Corners station of Arizona Public Service, where a 750 mw unit is typically tripped off under load four times a year, in response to line faults, as a way to avoid loss of intersystem ties on the occurrence of permanent type faults (cf ref. 25).

However, considering the attitude of those power system engineers who are directly concerned with the operation of power plants, it became incumbent on the writer to seek solutions to the problem of safety valve lifting, and, with this in mind, when the original of U.S.

Pat. No. R27,842 was written, he included in it, as see par. 3 of column 24, the statement "I propose to avoid operation of the high pressure safety valves by providing fast acting and fully commercially available dump valves, which are programmed by the fast turbine control system to dump high pressure steam, either to atmosphere, or preferably, to the turbine condenser, with concomitant supply of spray water for cooling purposes." the idea being to employ enough dump valves to eliminate lifting of safety valves.

When it came to valves for dumping high pressure steam, powermatic, pilot operated type valves were already commercially available, while also it is feasible to provide shut off valves ahead of them, which, when done, allows repair without need to schedule a unit shutdown.

However, there was a question as to what to employ when it came to providing dump valves for use at reheat pressure.

In 1964, in discussion of this problem with personnel of the Crosby Valve Co. of Wrentham, Mass., the point came out that safety valves can be converted to power operated valves, and hence to "dump valves," by equipping them with air operated lifting devices which, it was claimed, would cause the valves to lift in a fraction of a second, while the point also applied, that if used to supplement safety valves, these valves could also be mounted downstream of shut-off valves.

Thus when the original of U.S. Pat. No. R27,842 was written the writer knew how to proceed to make available normally non-leaking valves for dumping both high and reheat pressure steam to atmosphere, with provision to allow maintenance when required, absent need to schedule a unit shutdown.

C. CONCEPT OF SUSTAINED PARTIAL INTERCEPT VALVE REOPENING

As it turned out the availability of non-leaking bypass valves, adapted for use at reheat pressure, led the writer to the idea that it would be possible, and that it could also be desirable, to have recourse to restricting the extent of reopening of intercept valves, whereby to effect a sustained reduction of turbine driving power by this means, and it was with this in mind that he included in the application for the original of U.S. Pat. No. R27,842 the statement (cf par. 7 column 24)

"Also, it will be clear that where a sudden, sustained drop in driving power of a reheat type turbine is wanted, it will be only feasible to achieve desired results by using the intercepting valve as a steam flow modulation device to supplement control valve modulation of steam flow to the high pressure turbine which, however, it is judged can be accomplished by those skilled in the art merely with application of generally known practices (21, 22)."

However since the statement does not describe what, in detail, would be done, it is not thought to anticipate either what is disclosed in copending application 388,619, now U.S. Pat. No. 3,849,666, or the concept of effecting a type of preprogrammed intercept valve reopening that would terminate valve motion at a partly open position, that is covered in the present application.

The new concept of the present application, it may be noted, offers certain advantages in the way of simplicity, and can be used where a. as in Continental European type once-through fossil fuel and also HTGR, high temperature gas cooled reactor type nuclear installations, the high pressure turbine is provided with a by-pass to the cold reheat line, b. in those nuclear installations in which extent of reheat is slight, and there is therefore no problem of protection of the reheater from overheating, c. when control valves either are held open, or are first rapidly fully or partly closed, and then fully opened, as also when d. sustained *partial* control valve closure is employed and is supplemented by initiation of a reduction in rate of steam generation within the steam supply source, but the notable feature is that sustained driving power reduction can be effected without need to program a change in steam generation when any of control procedures (a), (b) or (c) above are made use of, a feature of importance since, with use of these techniques, when a faulted line has been opened on a temporarily sustained basis, either as a matter of general policy, or because of development of a refault on automatic circuit breaker reclosure, if and when the line is, perhaps, quickly restored to service, it becomes possible to reestablish full generator output in a matter of seconds, since there had been no need for recourse to the slow and also slowly reversed process of change in rate of steam generation.

D. HISTORY OF THE CONCEPT OF EMPLOYING LOW PRESSURE STEAM BY-PASS VALVES AS A WAY TO SOLVE THE PROBLEM OF FAST VALVING TURBINES THAT RECEIVE STEAM FROM BOILING WATER TYPE REACTORS

Beginning in April 1966 the writer endeavored to interest Commonwealth Edison in equipping two GE nuclear type turbines with provision for fast turbine valving.

This led, in due course, to stability studies that demonstrated ability to deal with the problem of delay in fault clearance.

However, when it came to fast valving these turbines, which were to be installed in a power station named Quad Cities, studies carried out by GE Schenectady, which were based on purely momentary intercept valve closure, established that a problem would develop, in that, due to slow reopening of intercept valves, it could be predicted that pressure ahead of the low pressure turbine would rise when fast valving was invoked, and this, in turn, would cause a rise in the pressure ahead of the high pressure turbine, that would cause a hazard of scramming the reactor, which was of the BWR, or boiling water type, that GE was producing at San Jose.

On looking into what was involved, the writer determined that it had become GE San Jose practice to use spring loaded valves, of a modified type, which Crosby Valve had been producing, as a means of discharging 1,000 psi steam to the containment vessels of its BWR reactors, the modification consisting in applying a bellows which would seal the path of discharge steam and, with the valve in closed position, prevent leakage of air into the condenser.

It then occurred to the writer that these valves could be converted to a fast acting power operated type by equipping them with air operated lift cylinders, and that they could be used as a way to solve the Quad Cities units fast valving problem by providing so that they would respond to a fast valving signal by popping open and discharging to the condenser, either, a. high pressure steam, or b. low pressure steam.

To progress this idea further Crosby Valve agreed to carry out tests which would demonstrate speed of operation, and this was done, first on a small valve in July of 1967, and later, in November, on a larger valve, of the size used in nuclear installations.

GE had previously considered using air lifted valves in a BWR installation but had given up the idea on the assumption that they would not be fast enough.

The November test, which was witnessed by GE personnel, showed that the valves could be opened in less than 1/10th second, while also Crosby Valve planned to step up speed to 1/20th second, which was judged by GE to be sufficiently fast.

The November test led to GE San Jose thereafter incorporating the air lift feature as an element of its high pressure relief valves.

Also San Jose accepted that use of air lift valves ahead of either the high or low pressure turbine could be used as a way to prevent reactor scram as a result of use of fast valving, but, as it turned out, Commonwealth Edison decided against use of fast valving on the theory that it might cause problems that would prove to be a source of difficulty and so nothing was done.

However the idea of utilizing a power operated fast acting low pressure relief valve as a way to limit rise of pressure ahead of the low pressure turbine, and hence, also ahead of the high pressure turbine and within reactors of BWR type, when fast valving was employed, remained as a presumably entirely workable concept.

Also as early as November 1967 the writer brought to the attention of the Crosby Valve Co. the point that a market could develop for valves that would by-pass around both low pressure turbines of nuclear units and intermediate pressure turbines of fossil fuel steam source type, as a way to allow fast valving of the sustained reduction of driving power version.

In continuation, in 1969 the writer took up with Crosby Valve the matter of the cost of equipping the spring loaded low pressure relief valves of TVA's Browns Ferry BWR reactor type nuclear steam electric units with air lifters.

This was at a point when TVA was giving consideration to use of fast valving of the sustained reduction of driving power type at Browns Ferry, something that they were deflected from as a result of representations by GE Schenectady as to the possibility of problems with the drain system of the moisture separators.

Rather than provide to fast valve at Browns Ferry, TVA decided to ask for this feature as an option in the case of two 1300 mw nuclear units that were to be installed in a station at Watts Bar.

Since Westinghouse was a bidder and could provide sustained reduction of driving power with use of its PWR pressurized water reactors, which were equipped with 45 percent high pressure by-pass systems, and since Westinghouse was not prepared to hold its intercept valves in a fixed modulating position, the concept of providing for use of sustained partial intercept valve reopening was not raised, and this also applied when it later came to a similar nuclear station that was to be located at Bellefonte, and that would utilize a Babcock & Wilcox PWR type nuclear reactor.

In 1973 the question again came as to the feasibility of fast valving a TVA BWR installation, this time in relation to a plant to be located at Hartsville which would incorporate four 1220 mw turbines that would be supplied with steam from GE BWR type reactors.

The Hartsville turbine award went to Brown Boveri, which concern quoted on provision of fast turbine valving of the sustained reduction of driving power type as an extra cost option.

Brown Boveri has, since the award, been in touch with GE San Jose, and reportedly there has been consideration of employing air lifting of spring loaded low pressure relief valves as a way to avoid a reactor scram, but, to my knowledge, there has been no published account of employment of sustained partial reopening of intercept valves as a means of effecting sustained reduction of driving power type fast valving in BWR steam electric installations.

E. HISTORY OF THE CONCEPT OF USE OF SUSTAINED PARTIAL LIFTING OF INTERCEPT VALVES AS A MEANS TO PROVIDE FOR FAST VALVING OF THE SUSTAINED REDUCTION OF DRIVING POWER VERSION IN THE CASE OF REHEAT TYPE FOSSIL FUEL STEAM ELECTRIC INSTALLATIONS

The concept of utilizing electrically controlled air assisted spring loaded valves as by-pass valves that would discharge steam from a point just ahead of an intermediate pressure turbine of a fossil fuel steam electric installation to make possible sustained partial lifting of intercept valves as a way to accomplish sustained driving power reduction type fast valving, yet avoiding lifting of reheat pressure safety valves, was gone into with Crosby Valve as early as the latter part of April 1964 though this was in the context of using these valves to divert steam to atmosphere for the period of time required for fast as feasible reduction of boiler fires, since, at that time, these valves were not understood to be capable of being adapted to allow the discharge of steam to the condenser.

It was recognized that other types of fast acting valves, that could be used to discharge to the condenser, were available, but engineers of Ebasco Services, with which contact was established in 1966, took the position that leakage would represent an insurmountable obstacle to their use.

However, the availability, as of 1967, of sealed type spring loaded valves such as were developed for use in connection with BWR nuclear installations, coupled with the approach of installing isolation valves around these valves as a way to allow repair without scheduling a unit shutdown, provided a way out of this difficulty.

Standing in favor of sustained partial intercept valve lifting is the fact that it can be used as a way to either avoid or minimize need to readjust rate of steam generation, while standing against it is the expense of providing the valves and their shutoffs.

At the 1969 American Power Conference, a Siemens paper (35) described the German practice of regularly equipping oncethrough boiler steam electric installations with by-pass systems that diverted steam both around the high pressure turbine to the cold reheat line and from the hot reheat line to the condenser, as both control and intercept valves were simultaneously partly closed in response to change in speed in the event of sudden partial loss of load which at once made clear that, when it came to Germany, sustained driving power reduction type fast valving for stability improvement purposes, would be very easy to provide.

However, as also brought out in the statement of the prior art contained in the writer's application Ser. No. 388,619, now U.S. Pat. No. 3,848,138, the writer took up with Siemens and later with M.A.N., the idea of providing response to line faults as a means of improving system stability, while the idea was viewed as certainly new, it was not accepted as providing a solution to an economic need.

Also, although an article on electrohydraulic turbine control systems that appeared in a recent issue of Elektra (66)* discusses fast valving, (as see sections 3.4 and 5.8), and stresses its potential importance, though techniques of fast valve closure and fast full reopening are cited, no mention is made of partial reopening of either control or intercept valves, and while there is, in the U.S. literature reference to sustained partial opening of control valves after fast closure effected for purposes of improving power system stability (21, 22, 23, 25, 67), the writer fails to recall any instance of published reference to sustained partial opening of intercept valves following an initial process of closure in the context of a measure intended for improvement of stability.

*Numbers in parentheses refer to Table of References.

F. PROVISION TO PROVIDE AGAINST DEVELOPMENT OF INSTABILITY OF DRAIN SYSTEMS OF MOISTURE SEPARATORS, AS A CONSEQUENCE OF APPLICATION OF FAST TURBINE VALVING TO BWR AND PWR TYPE NUCLEAR STEAM ELECTRIC INSTALLATIONS

When it comes to BWR and PWR type nuclear installations GE Schenectady has stressed the fact that fast valving might cause objectionable instability of moisture separator reheater drain systems.

Here the point that applies is that decrease in MSR pressure tends to cause the flashing into steam of water contained in the drain system, and can result in a surge of drain water back into the MSR.

This is a problem that also develops when the steam acceptance of the high pressure turbine is reduced, whether as a result of closure of control valves, or reduction of rate of steam generation, but the problem is not consequential if rate of steam acceptance, and hence also MSR pressure reduction, does not exceed a valve which depends, in part, on the way the MSR drain system is designed.

When control valves are held open, and intercept valves are fully closed, and thereafter fully opened, and especially if they are reopened slowly, MSR pressure will at first increase, but, in due course, will decrease to the value that applied prior to initiation of fast valving, and it has been the fact that the process of decrease could cause MSR drain system instability that GE has warned against.

Pressure increase is greatest when intercept valves open slowly, and since this fact is readily understood by those skilled in the art, it should be, and in some quarters has been, obvious that speeding up the process of intercept valve reopening would minimize it, and it would presumably be obvious, in turn, that such reduction of pressure rise would operate to minimize rate of subsequent MSR pressure drop.

However, I have conceived of additional techniques for reducing rate of MSR pressure drop consequent on fast valving, which measures are disclosed in this application.

Also, where there has been and remains a good deal of power industry concern as to the MSR drain system problem, and a chance that it could, if indeed it does not already, stand in the way of employment of fast valving of BWR and PWR nuclear installations, the fact that the techniques hereinafter described for avoiding or largely minimizing rate of MSR pressure drop, as it would appear, have not heretofore been advocated, would [seam to be well indicated that they are not obvious.] *seem to indicate nonobviousness.*

G. PROVISION TO SELECTIVELY REPOSITION INTERCEPT VALVES OF LOW PRESSURE TURBINES OF NUCLEAR STEAM ELECTRIC INSTALLATIONS, AS A MEANS OF EFFECTING SUSTAINED TYPE FAST VALVING FOR PURPOSES OF STABILITY IMPROVEMENT

This application introduces the concept of selectively effecting preprogrammed processes of closing and reopening of intercept valves located ahead of low pressure turbines of nuclear type where more than one low pressure turbine receives power from a single high pressure turbine, with the objective of improving power system stability when jeopardized by suddenly occurring events.

Not only has there been no evidence of any prior art in this area, but the concepts involved, when explained to turbine control people, have been viewed as novel.

SUMMARY OF THE INVENTION

The invention has relation to improved methods for rapidly varying the driving power of turbines by repositioning intercept valves, and optionally also simultaneously repositioning control valves and controlling the operation of steam supply systems, whereby to avoid development of power system instability when jeopardized by transmission line faults and other stability endangering events, while at the same time avoiding damage to equipment.

Generator drive systems of power system steam-electric installations comprise a high pressure turbine, plus one or more low pressure turbines, plus, in the case of installations in which steam is generated with use of fossil fuel, or with an HTGR or high temperature gas cooled type nuclear reactor, one or more intermediate pressure turbines which are operated with steam that is highly superheated in reheaters.

Control valves are employed to control supply of steam to high pressure turbines and intercept valves are provided immediately ahead of intermediate pressure turbines and low pressure turbines of nuclear installations which do not intensively reheat steam discharged from the high pressure turbine.

In the U.S., at least, it is common practice for the first stage of a high pressure turbine to be of the impulse type and for first stage nozzles to be grouped into segments with the steam supply to each segment individually controlled by means of individually operable control valves.

It also was, at one time, a common practice and it remains feasible to employ by-pass type control valves that admit high pressure steam to intermediate stages of high pressure turbines.

Providing to automatically fully or nearly fully close intercept valves in response to an indication of a line fault, and thereafter fully reopen, offers a way to decrease the tendency for power system generators to lose synchronism as a result of line faults and other system stability endangering events, but momentary closure of this type tends to increase pressure within reheaters and moisture separators, with two effects, 1. the post-fault or more generally the post stability endangering event driving power of the turbine or turbines down stream of the intercept valve or valves will exceed the pre-fault, or pre-event driving power, a circumstance which tends to adversely affect system stability, this being especially the case when the fault or other stability endangering event results in the sustained opening of one or more transmission system circuit breakers, and thereby operates to impede transmission of power in the post-fault or post-event regime, whereas actually it would normally be advantageous for the total post-fault or post-event driving power of the turbine to be held less than, and, as a rule, preferably somewhere in the range of 60 to 90 percent of pre-fault or pre-event value,
2. reheat and MSR (moisture separator and moisture separator reheater) pressure safety valves may discharge steam and in some cases may thereafter leak and require maintainance.

One proposed approach to the solution of problem (2) above is to speed up the process of intercept valve reopening, while another is to raise the setting of the reheater and MSR pressure safety valves.

However these approaches do not solve problem (1).

An obvious way to avoid both problem (1) and (2) is to reposition control valves so as to reduce high pressure turbine steam acceptance on a sustained basis.

However, there has been reluctance on the part of engineers to employ this procedure because of the conviction that it would be difficult and expensive to provide so that it could be effected without lifting of high pressure safety valves, which, when occurring, is likely to cause damage to the valves that can require scheduling a unit shutdown to allow effecting repairs.

Also, in the case of fossil fuel fired installations, there has been concern as to the feasibility of readjusting fuel, water and combustion air supply rapidly and accurately enough to prevent damage to reheaters due to overheating, and as to whether what would be done would cause objection from the standpoint of excessive thermal fatigue damage to turbines.

Further, in the case of boiling water reactor, or BWR type nuclear installations, there are stringent limitations in respect to the extent to, and speed with which, control valves can be closed.

In the present invention the problems presented are dealt with by employing a method of fast valving which brings into effect preprogrammed process of, 1. intercept valve closure which are fast enough and sufficient in extent to have a favorable effect on generator rotor first swing stability, and preferably take the form of full closure effected in ¼ second or less,
2. subsequent reopening of some or all intercept valves to a partially open position with reopening preferably initiated somewhat in advance of the first forward swing of the generator rotor, and carried to completion within a fraction of a second following the peak of that swing, coupled with 3. preprogrammed servo valve implemented retention of partially opened intercept valves in, or substantially in, the preprogrammed position that they attained in their rapidly executed reopening process, with which techniques the intercept valves assume and retain a partially opened position at the end of a preprogrammed repositioning cycle, until such time as an election is made to further reopen them.

In the case of turbines in which steam from a high pressure turbine passes directly to two or more low pressure turbines the above procedures may optionally be modified by either closing and holding closed the intercept valves of only one or more but not all low pressure turbines, or closing the intercept valves of all turbines and thereafter rapidly opening the intercept valves of one or more but not all turbines.

In one approach discharge of steam through reheat and low pressure safety valves can be tolerated, which, if planned on, can be favorably implemented, on a control basis, by providing so that electrically controlled air operated lifters will be applied to a predetermined number of spring loaded type valves, and that those valves will be lifted in response to a fast valving initiation signal.

In an alternate approach, which is consonant with practices that commonly apply in the case of continental European steam electric installations of fossil fuel type (35, 65, 66, 70, 71), opening of reheat or low pressure safety valves is prevented by provision of servo controlled by-pass systems that discharge desuperheated steam either from the hot reheat line, or, in the case of BWR type nuclear installations, from a point just ahead of the low pressure turbines to the condenser, in response to increase in steam pressure.

In still another approach prevention of discharge of steam through reheat or low pressure safety valves of PWR type nuclear or fossil fuel installations is prevented by employment of preprogrammed control valve repositioning.

Where discharge of steam through reheat or low pressure safety valves is tolerated, as also where power operated reheat or low pressure steam by-pass systems are employed, provision to close control valves is optional, while if control valve repositioning is employed election can be made to employ any of the following preprogrammed procedures.

1. full or partial closure followed by full reopening,
2. full or partial closure followed by partial reopening,
3. partial closure.

From the standpoint of preservation of system stability, control valve full closure in ¼ second or less is advantageous, preferably followed by comparably fast full or partial reopening, with initiation of reopening adjusted to take place so that full extent of preprogrammed reopening is achieved within a fraction of a second following completion of the first forward swing of the generator rotor.

Where boiling water reactors represent the steam supply source, it becomes necessary to limit the speed of control valve closure and to avoid closure that, even momentarily, causes a reduction of steam acceptance of the high pressure turbine that exceeds the capacity of the turbine's high pressure by-pass system.

In steam electric installations in which, following continental European practice, desuperheating type steam by-pass systems are provided as a way to automatically by-pass superheated steam around the high pressure turbine to the cold side of a reheater located ahead of an intermediate pressure turbine, control valves can be rapidly repositioned in any desired degree, on a sustained basis up to a point dependent on the capacity of the by-pass system, but would preferably be fully closed and thereafter partly reopened to a point at which the steam supplied to the cold reheat line coincides with the steam acceptance of the intermediate pressure turbine, at the time of completion of preprogrammed partial intercept valve reopening.

In the case where the steam supply source comprised a PWR, or pressurized water type reactor, there would normally be no restriction on fast full closure of control valves, provided that they were promptly reopened to a point at which reduction of high pressure turbine steam acceptance did not exceed the capacity of the turbine's high pressure by-pass system.

In the case of both PWR and BWR reactor type steam supply sources, it can be advantageous to minimize both moisture separator reheater depressurization and extent of pressure rise, which implies, that, in the case of PWR installations, it is important to closely relate the extent of preprogrammed reduction of steam acceptance of the high pressure turbine to that of the low pressure unit.

Implementation of intercept and control valve repositioning can take some or all of several types of preprogrammed procedures listed below.

a. fully closing all intercept valves in a fraction of a second by rapidly opening valve actuator oil dump valves,
b. fully or partly closing all intercept valves under servo control,
c. after initial full or partial closure of all intercept valves, repositioning under servo control,
d. supplementing item (c) by fast partial intercept valve reopening initiated somewhat in advance of the generator rotor first forward swing, preferably effected within ½ second, with control of extent of reopening determined with use of metering cylinders or with servo or cam operated valves,
e. fully closing all or some control valves in a fraction of a second by rapidly opening valve actuator oil dump valves, or
f. fully or partly closing all control valves under servo control,
g. after initial full or partial closure of control valves, fully or partly reopening under servo control
h. supplementing item (g) by fast full or partial control valve reopening initiated somewhat in advance of the instant of generator rotor first forward swing, and preferably effected within ½ second.

Supplementary preprogrammed initiation of reduction of rate of steam generation and initiation of steam by-passing operations and of discharge of steam to atmosphere can also, optionally, be employed, and provision of a supplementary preprogrammed process of full opening of intercept valves can additionally be elected.

A main object of the invention is to allow, via provision in generating station design, so that power transmission lines can be subjected to higher transmitted power loadings than could otherwise be employed without a consequent increase in hazard of development of system instability on the occurrence of line faults and certain other system stability endangering events.

Another object is to increase the amount of power that can be safely transmitted over a right of way of given width.

A further object of the invention is to allow increasing the amount of power that can be transferred over a line operated at a given voltage.

Another object of the invention is to provide so as to minimize hazard of development of system instability in the event of infrequently occurring severe contingencies such as delay in fault clearance.

Another object of the invention is to achieve the above objectives in a manner that minimizes generating station first and operating costs including costs related to providing for steam bypassing and for discharging steam to atmosphere via power operated valves, and that avoids need to take generating units out of service to allow repairs.

Another object of the invention is to provide improvements in generating station design which increase effectiveness and eliminate or minimize penalties in employment of fast turbine valving, whether or not supplemented by employment of dynamic braking, as a way to prevent cascading type system instability.

Another object of the invention is to avoid development of system instability subsequent to the occurrence of first generator swings following a line fault or some other system stability endangering event.

Another object of the invention is to avoid situations where, even though a generator remains in synchronism following a fault on a line tieing it to a system, the disturbance resulting from the fault has the effect of causing loss of sychronism of some other generator or generators.

Another object of the invention is to effect fast turbine valving for system stability improvement in ways which do not necessitate readjustment of rate of steam generation within steam generators.

Another object of the invention is to effect fast valving of steam electric installations which receive their steam from either PWR or BWR nuclear steam supply sources, in such manner as to eliminate significant reduction of moisture separator reheater pressure, whereby to avoid instability of MSR drain systems.

Still another object of the invention is to prevent the scramming of the reactor when provision for fast valving for stability improvement purposes is made in BWR type nuclear steam electric installations.

It is an important element of the invention that it can be usefully employed as an aspect of a process of combined fast valving and momentary application of braking load.

BRIEF DESCRIPTION OF DRAWINGS

The subject matter which is regarded as the invention is capable of being implemented in a variety of ways. In practice what is necessary to facilitate its employment is to devise ways to apply it in power system steam electric installations of already developed types, with a minimum need to introduce changes in design that would be costly and time consuming to put into effect.

Therefore the drawings have been prepared in this context.

In the drawings

Figure 1:
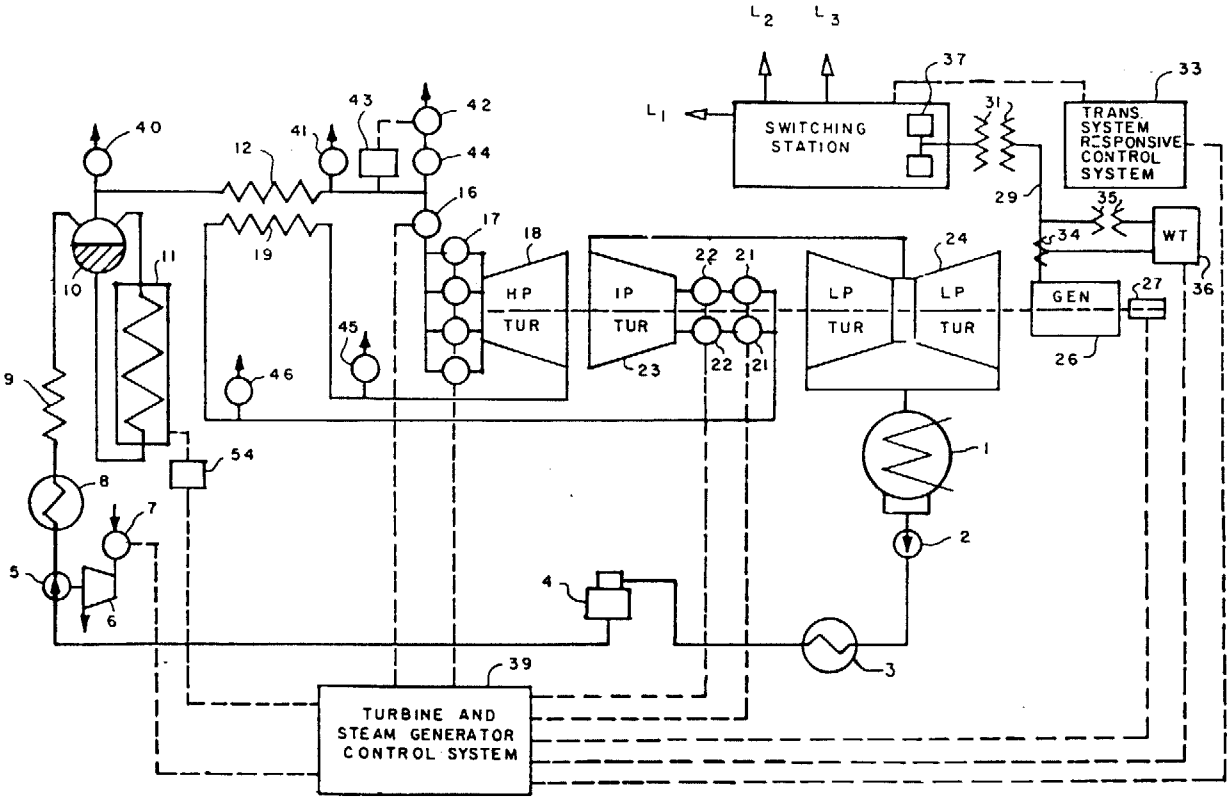
Figure 2:
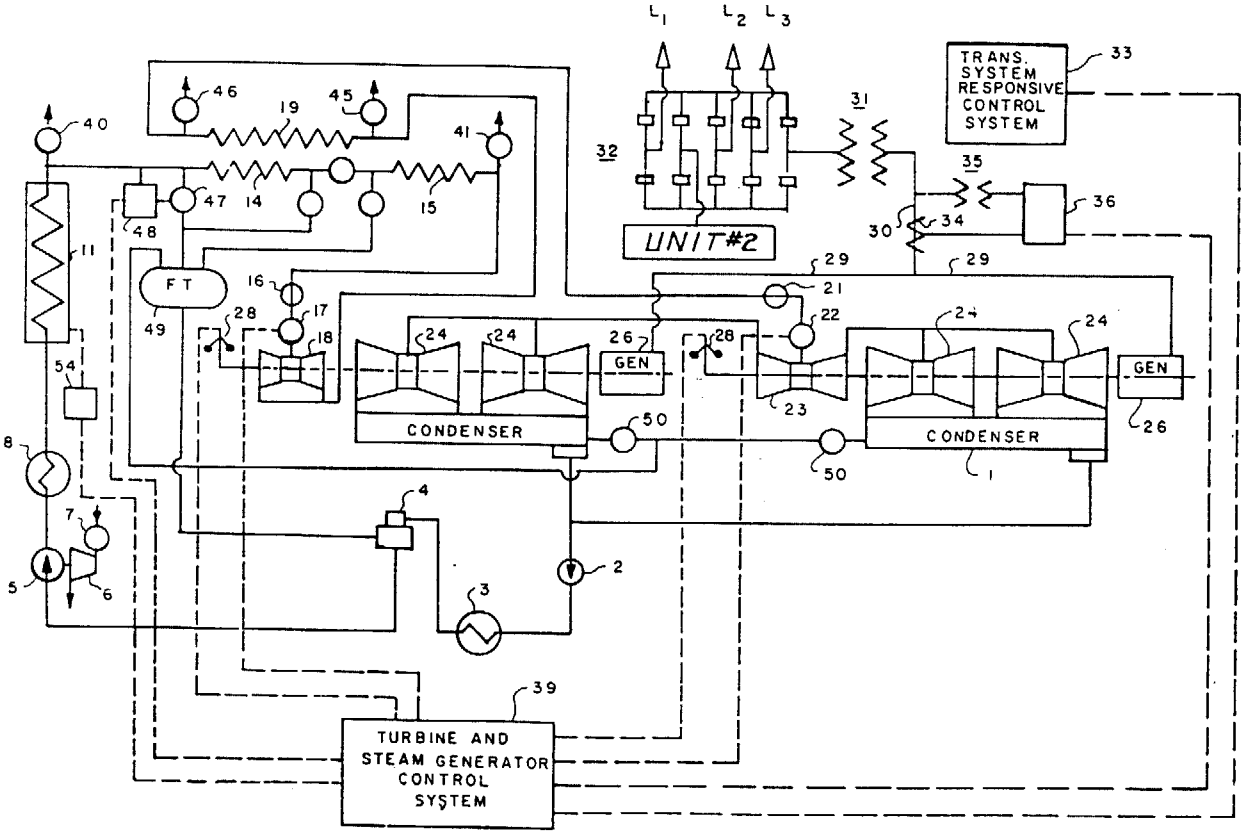
Figure 3:
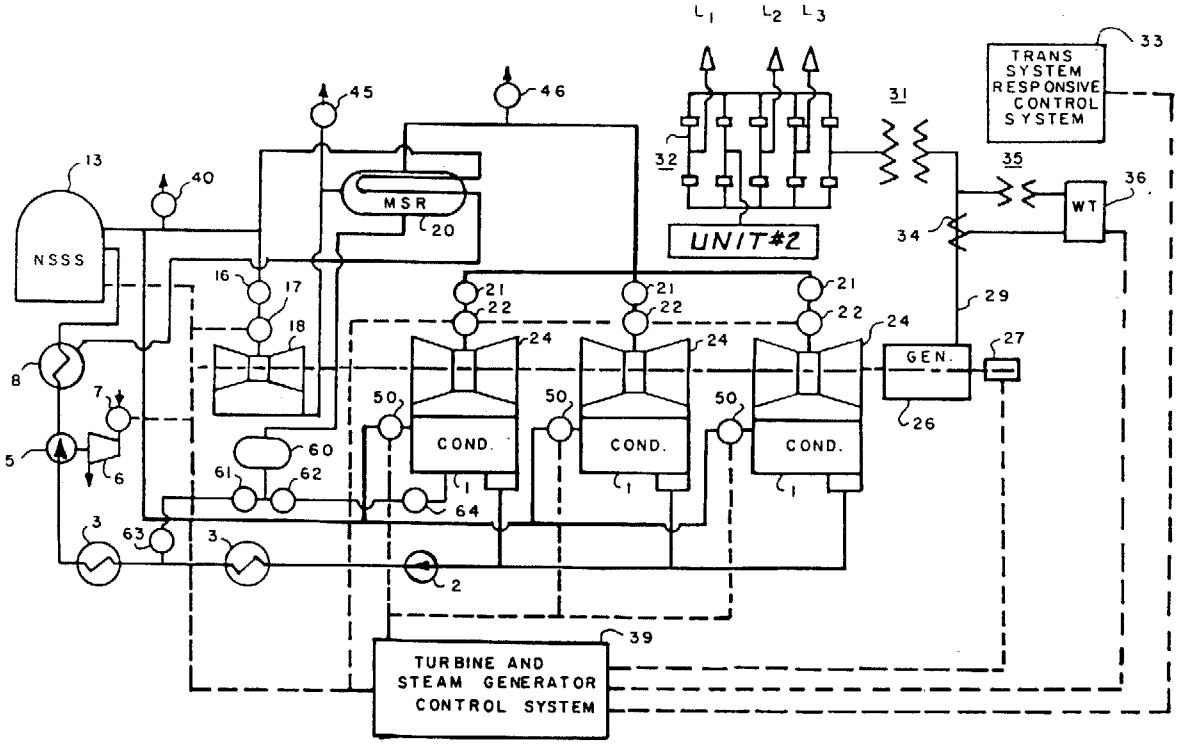
Figure 4:
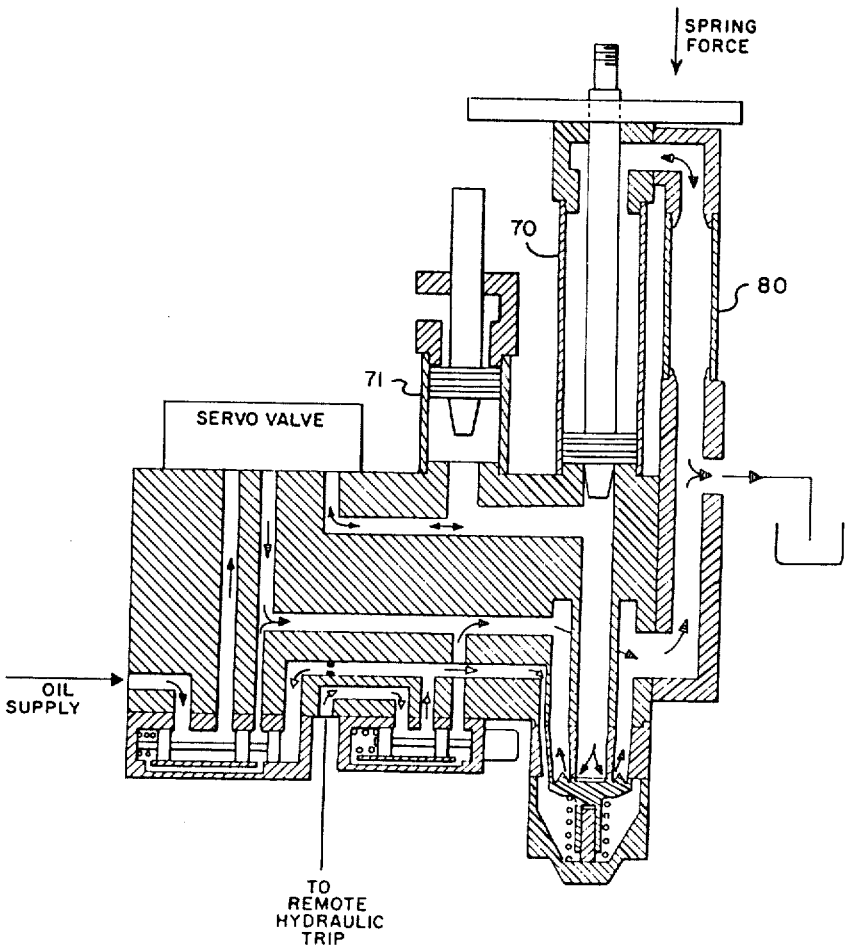
Figure 5:
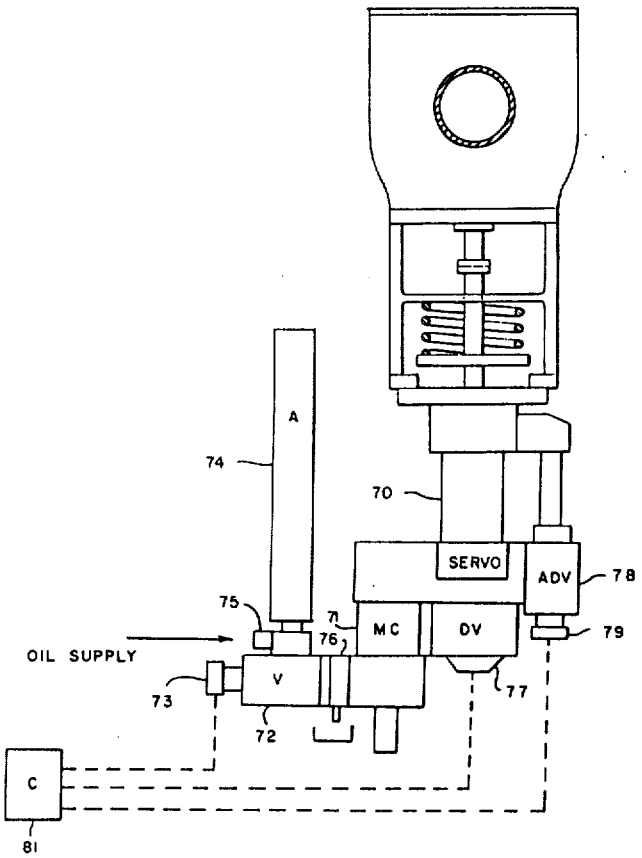
Figure 6:
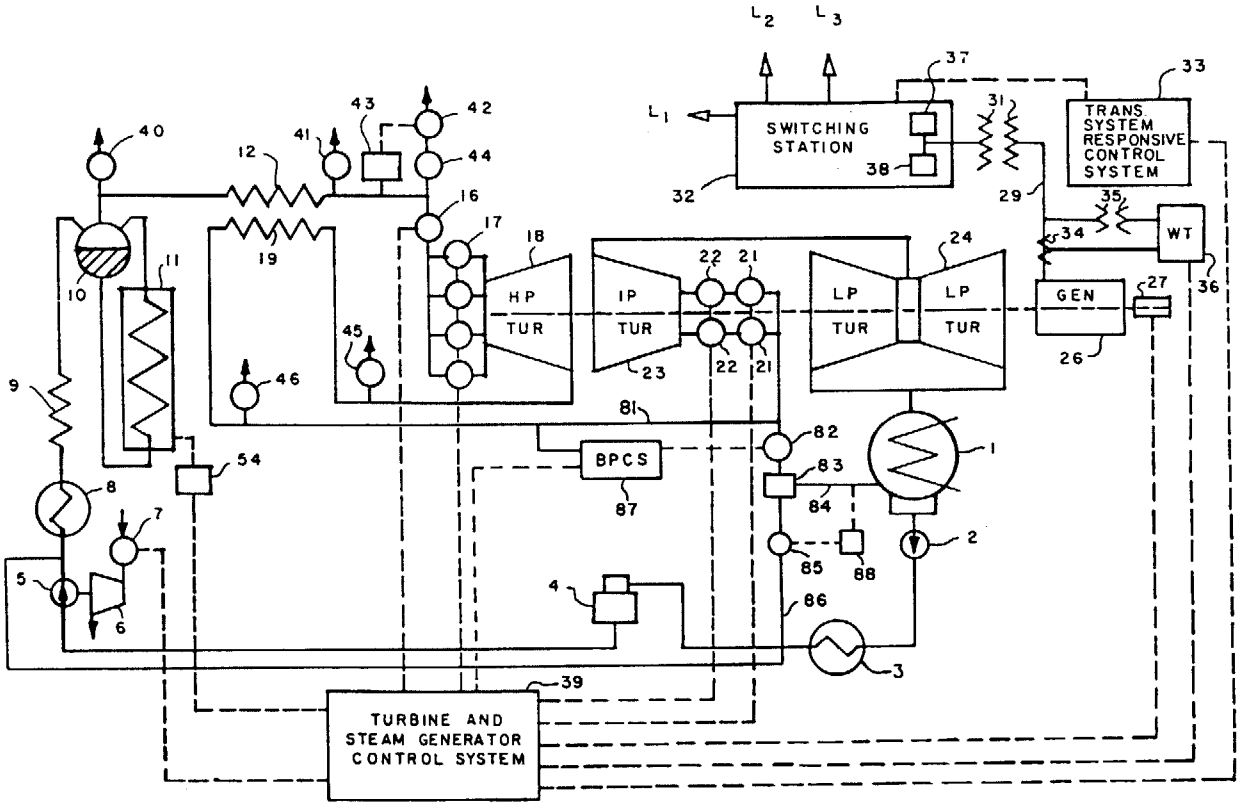

FIG. 1 is a simplified schematic view of a typical fossil fuel type steam turbine driven generating unit of U.S. design to which is coupled a drum boiler type of steam generator, FIG. 2 is a simplified schematic view of the No. 2 unit of TVA's Cumberland generating station in which a Brown Boveri cross compound turbine receives its steam from a Babcock & Wilcox once through steam generator, FIG. 3 is a simplified schematic view of a large nuclear turbine which is supplied with steam from a nuclear steam supply source which could be of either the boiling water (BWR) or pressurized water (PWR) reactor type, FIG. 4 is a simplified partial representation in schematic form of an arrangement adapted to rapidly reopen a closed turbine steam admission valve but do so part way only, FIG. 5 represents an exterior view of an intercept valve that has been provided with means for effecting fast partial reopening, FIG. 6 comprises FIG. 1, modified to include a desuperheating type by-pass system that is arranged to discharge steam from the hot reheat line to the condenser.

DESCRIPTION OF THE PREFERRED EMBODIMENTS

In FIG. 1 water that has drained down to the bottom of condenser 1 is pumped by pump 2 through low pressure feed water heater system 3 to deaerator 4 from which point it flows to boiler feed pump 5 which is driven by boiler feed pump turbine 6 which receives steam from one or more sources not shown through valve system 7.

From the boiler feed pump water passes into high pressure feed water heater system 8, next to economizer 9 and next into drum 10 from which it passes to the bottom of and up through furnace 11 and returns to the drum as wet steam.

The steam so produced next passes through superheater 12, stop valves 16 shown for convenience as a single valve, but normally consisting of four valves one being series connected to each of the four control valves 17 of partial admission type high pressure turbine 18, wherein the nozzles ahead of the control stage of the turbine are divided into four segments which are supplied with steam individually through the four control valves.

After passing through the control valves and the turbine the steam enters reheater 19 and from there flows through a pair of stop valves 21 and series connected control valves 22, and then into intermediate pressure turbine 23 and from there to low pressure turbine 24 and from there flows into the condenser where it is reconverted to water. The three turbines are coupled together in line and drive generator 26 which supplies three phase power to three transformers 31 through generator output leads 29. In the transformer 31 the voltage is stepped up from typically around 22,000 volts to a voltage which is today typically in the range of 345 to 500 kv, and can range up to 765 kv.

The transformer connects to switching station 32 through a pair of circuit breakers 37 and 38, shown conventionally as square boxes, which are to be understood to represent two of a larger number of circuit brakers not shown in the drawing by which the generator makes connection to transmission lines $L_1$, $L_2$ and $L_3$ and, in the bulk of cases, also to at least one other generator located within the same station that houses the generator shown.

Transmission system responsive control system 33 is to be understood to incorporate a protective relaying system which acts to cause the opening of circuit breakers at which lines terminate, on the occurrence of line faults, and in the case of certain other events, and is to be understood to incorporate also fast valving signal generating and logic means which may and usually would be made responsive to one or more parameters of system prefault or, more generally pre-system disturbing event system conditions, such as lines not in service and the magnitude of generated and transmitted power, plus the fact of occurrence of a fault or other event of a type that could endanger system stability, which in the case of a fault can depend on fault type and location, while also the control system may be arranged to respond to the occurrence of a stuck breaker or some other post instant of fault initiation event, or to the extent and distribution of line fault induced reduction in power flow over one or more lines, or in respect to the extent and rate of reduction of the power output of generators, (57, 58).

Procedures of these types and others directed to determining when to initiate and to modify fast valving cycles have already been described in several patents (3, 21, 22, 23, 46, 54) one of which has already expired, while certain additional procedures are described in the writer's pending patent application ser. no. 244,594.

In addition control system 33 usually receives information by carrier current or some other channel of communication which has relation to power flow over intra and inter system tie lines and as to the power output of other generators located in and remote from the station, which information is used to develop a signal that is created for the purpose of suitably modifying the load reference of the turbine's control system so as to cause the turbine to become a participant in programs of tie line power flow control and system economic dispatch (53).

Also as shown by the dotted line connecting polyphase watt transducer 36 which is connected to current transformers 34 and potential transformers 35 and which generates a signal proportional to generator power output, control system 33 receives such a signal as one of its inputs.

Turbine and steam generator control system 39 receives as inputs the outputs of generator rotor speed transducer 27, which usually appears in the form of a frequency signal which is generated by a magnetic pickup which is influenced by a toothed gear on the generator shaft, and in addition receives as inputs an output from watt transducer 36 and outputs from transmission system responsive control system 33 which take the form of turbine governor load reference modification signals generated as aspects of tie line and economic dispatch control systems and also one or more types of signals which initiate fast valving, or that may relate to what will be preprogrammed to be done when fast valving is initiated.

Thus the dotted line that in FIG. 1 runs from transmission system responsive control system 33 to turbine and steam generator control system 39 is to be understood to include as a minimum two channels of information transfer namely one that is used to modify the turbine's load reference system as an aspect of tie line and economic dispatch control systems and at least one fast valving signal transfer channel.

However it is also to be understood that optionally, in addition, the number of information channels can be expanded to allow selective initiation of more than one type of preprogrammed fast valving cycles, and to permit modification of the parameters of such programs in response to such factors as system conditions existing prior to a line fault or other system stability endangering event, and the occurrence and nature of post fault events.

Coming now to the functions of turbine and steam generator control system 39 these are in the first instance to continuously control the position of the turbine's control valves 17 and also valve system 7 of the boiler feed pump turbine 6 and boiler fuel and air supply control system 54, and in addition the position of control and intercept valves in response to fast valving signals where the object is system stability improvement and also as an aspect of turbine overspeed control systems which systems may also provide for control of stop valves 16 and 21 though in the first instance these stop valves are controlled by emergency governors that represent a built-in feature of the turbine.

When it comes to providing to implement fast valving one useful thing to do that has not been provided for in U.S. steam electric installations to date with exceptions in the case of Four Corners, and TVA's stations Cumberland and new stations comprises 1. effecting a process of sustained partial control valve closure with a view to avoiding development of instability on generator rotor second and following swings and in the steady state following loss of one or more lines, and as a way to avoid need to trip-off a generator such as could otherwise apply.

Also another new but desirable thing to do is to 2. so provide that the curve of turbine driving power versus time begins to rise at about the time that the generator rotor has attained the peak of its first forward swing so as to reduce the extent of generator rotor first backward and second and following forward swings (56).

Also a further thing that is desirable is to 3. avoid lifting high pressure safety valves 40 or 41 in order to prevent damage that could require scheduling a turbine shutdown for the purpose of effecting reapairs.

Objectives (1) and (3) tend to be in conflict in that reduction of high pressure turbine steam [accepts] *acceptance* such as occurs when control valves close operates to cause increase in pressure ahead of the turbine. [However provision] *Provision* of one or more power operated relief valves 42 which often are arranged to make connection to the high pressure steam line ahead of the turbine stop valve through shut-off valves 44, and which are arranged to open when a pressure operated switch in control unit 43 senses the fact that steam pressure in the steam line exceeds a preset value, *can provide a solution.*

However, providing a sufficient number of these valves to prevent lifting of valves 41 adds to the expense of the station, and especially when, due to sluggishness of servo controlled valve repositioning, it would be useful from a fast valving standpoint to at first fully close thereafter reposition control valves to a partially open position.

However there is a feasible way around this problem which can be viewed as obviously offering advantages once it is grasped but that has not given evidence of being at once obvious to those skilled in the art, or who would profess to be skilled in the art of fast valving for system stability improvement, namely to provide to close two out of the total of four control valves that are commonly employed on partial admission type turbines, which brings with it the opportunity to rapidly reduce turbine steam acceptance to around 65 percent when starting from an initial condition of full load.

Alternatively it can be elected to provide to close only one valve, which however reduces driving power only about 8 percent or thereabouts.

Broadly the concept is to rapidly close some but not all control valves, so as to take advantage of what is feasible when partial admission is used.

Apparently there would be objection on the part of turbine producers to the rapid closure of more than half but less than all of the turbines control valves so that in practice not more than half would be so closed.

Also it is a feature of the present invention that, at the same time that a pair of control valves, or only one valve, would be rapidly fully closed by valve actuator oil dumping, the load reference of the speed governing mechanism would be rapidly reset and the dump valves rapidly reclosed so as to cause all valves to begin to move toward new preprogrammed positions under servo implemented feed back type control.

How in detail the foregoing can be provided for can be well understood by referring to U.S. Pat. No. 3,602,617 (54) which describes means for rapidly closing both control and intercept valves and for equally rapidly modifying turbine load reference.

Thus, referring to FIG. 1 of the patent, it will be seen that if provision is made to replace the unbalance relay logic therein identified as item 9 by preprogrammed fast valving logic provided within turbine and steam generator control system 39 and initiated in response to a transmission system responsive control system 33 fast valving signal output, what is wanted will be fully accomplished if a. the connections from the logic system to trigger 17 are opened in the case of two (or three) control valves, and b. the modifier is preset to bring about the desired sustained partial reduction in turbine load, rather than zero export load, such as the patent stipulates.

Coincidentally with causing control valve repositioning the fast valving signal would be arranged to suitably modify boiler fuel and water supply by temporarily disabling usual feed back controls and imposing a fast runback type of control action which will have the effect of readjusting the rate of fuel and feed water supply to new values that will be approximately in balance with the preprogrammed new sustained value of high pressure turbine steam acceptance in the post-fault or more generally in the post system stability endangering event regime.

It is not necessary to disclose in this application the details of how this would be done because means of providing fast runback of fuel and feed water supply, and hence steam generation, have for long been commercially available from leading boiler and/or boiler control producers and at most would require some degree of speeding up. (61,62).

Since if valves 42 open quickly such opening will slow down pressure build up in the superheater it also applies that in the interest of getting maximum advantage out of each valve, and hence minimizing the number that would need to be provided to prevent lifting of high pressure safety valves 41, it can also be useful to provide, as via energization of a quick closing time delay reopening relay, so that the fast valving signal causes control units 43 to immediately open valves 42 on a feed forward basis rather than in response to pressure rise, and retain them in open position for a period long enough for the preprogrammed reductions in fuel and feed water supply to take full effect, which perhaps would require a minute or more.

In the U.S. up to now, except at Four Corners and in TVA's newer stations, only the simplest form of fast valving has been provided by turbine-generator manufacturers as a response to customers requests for provision of fast valving as a means of system stability improvement, namely a system in which intercept valves only are repositioned momentarily.

In the case of GE what has been offered has conformed to what is shown in the upper part of FIG. 6 of U.S. Pat. No. 3,601,607 (54) in which initiation of fast valving depends on the magnitude and rate of increase of an unbalance between prefault turbine driving power and generator electrical load under fault conditions.

Actually response to this type of signal tends to be insufficiently selective (59) and for this reason it can be useful to employ a fast valving initiation signal provided by a transmission system responsive control system as a permissive control that would supplement response to generator power-load unbalance.

However in addition to providing for permissive control of fast valving of the up to now usually provided type it will normally be advantageous to preprogram at least some degree of fast reduction in high pressure turbine steam acceptance plus a related fast runback of boiler fuel and feed water supply partly as a way to prevent lifting of reheat pressure safety valves and partly for reasons of system stability improvement.

Where the fault condition occurs on a radial line or on a weak tie to other systems, control system 33 can recognize this fact, as also the prefault load on the line and from this information, if warranted, generate a fast valving signal that calls for only a small partial sustained or perhaps no sustained reduction in turbine driving power, and perhaps for fast full closure of only one control valve by valve actuator oil dumping, while, if a fault occurs on a strong tie that is carrying a heavy load, system 33 can recognize this condition and generate a signal that calls for a rapid closure of two or even all control valves by means of dump valve action (59).

Coming now to providing for fast partial reopening of intercept valves, as a first step it is necessary to provide so that intercept valve actuator oil dump valves reclose before reopening can be started, and since it is desirable for intercept valves to begin to open somewhat in advance of the first forward swing of the generator rotor, (50) and since time is required in which to bring about valve acceleration in a reopening direction, it works out that in situations where generating stations are interconnected by short lines of extra high voltage, that it can be desirable for dump valves to reclose in as little as 0.05 to 0.10 seconds following intercept valve closure.

Present GE dump valves which conform in design to what is shown in U.S. Pat. No. 3,495,501 (55) and are spring loaded to close, do not reclose until almost a second after the intercept valve closes.

However Westinghouse dump valves which are power operated to reclose do so as rapidly as required, and dump type valves also are commercially available that are equally fast.

Therefore there is nothing to prevent GE from providing sufficient rapidly acting dump valve means.

Since Westinghouse usually does not control its intercept valve actuators with servo control, and since GE's servo control is slow acting, to achieve the objective of rapidly implemented partial reopening in addition to providing ro rapidly reclose intercept valve actuator oil dump valves, it is necessary to provide via oil accumulators so that oil needed to reopen the valves can be supplied rapidly enough to cause them to open with sufficient speed, and also provide so that the process of rapid opening terminates when the valves reopen only part way, as say when they are 25 to 50 or perhaps 60 percent open (50).

In the matter of limiting the extent of high speed reopening, one approach would be to provide to admit oil to the valve actuator cylinders through position operated tapered spool decelerating type valves that would be arranged to close in response to cam action as the intercept valve opens.

In another and perhaps simpler approach a metering cylinder can be interposed between the valve actuator and the accomulator.

FIG. 4 shows a modification of the valve actuator mechanism shown in FIG. 2 of U.S. Pat. No. 3,495,501 which includes a metering cylinder 71 which when forced down by admission of oil at the rod end will cause oil to flow into valve actuator cylinder 70 and push its piston upward. As shown in the figure to avoid undesirable impact effects the piston of the cylinder is provided at the bottom with the same type of decelerating device, taking the form of a tapered spear protruding from the bottom of the piston, that is provided at the bottom of the actuator piston.

In FIG. 4, the piston of the metering cylinder is shown at mid stroke while for ease of inclusion in the diagram the cylinder has been shown mounted so that its rod end faces upward.

Actually it would appear to be preferable, however, to mount the cylinder with the rod end down as shown in exterior view in FIG. 5 wherein a pilot operated normally closed two way valve 72 which is electrically opened by energization of electrically controlled valve 73 provides a way by which oil stored in accumulator 74 can cause the piston of metering cylinder 71 to rapidly stroke upward thereby effecting rapid lifting of the piston of valve actuator cylinder 70.

Referring further to FIG. 5, 75 is a check valve which serves as a point at which oil can enter the accumulator from the oil supply system while 76 is an adaptor that provides for connection of valve 72 to the metering cylinder and that is provided with a bleed connection to a drain.

Item 77 represents the slow reclosing dump valve shown as item 10 in U.S. Pat. No. 3,495,501, while item 78 represents a duplicate of valve 72 which can function as an auxiliary fast reclosing dump valve since it is arranged to by-pass oil around th piston of cylinder 70, and is activated to open by energization of electrically controlled valve 79.

By reference to FIG. 1 of U.S. Pat. No. 3,495,501 it will be noted that in FIG. 5 the intercept valve assembly is being viewed from that side at which steam enters the valve, which is the reason why oil return line 80 of FIG. 4, which is item 9 of FIG. 2 of U.S. Pat. No. 3,495,501, is not visible.

The concept behind the showing of an auxiliary dump valve is that if it did not turn out to be easy to modify the valve described in U.S. Pat. No. 3,495,501 so as to render it fast reclosing, this valve could still be retained in use as a way to provide overspeed protection, while employment of fast reclosing as well as fast opening dump valve 78 would be effected primarily as a means of implementing fast valving, though it could also be used to provide a redundant means of closing the intercept valve in response to a condition of overspeed.

In the writers concept valves 72 and 78 could comprise a commercially available very rapidly acting valve that has been widely used for controlling the operation of die casting machinery.

However despite its record of successful use the turbine producer could well prefer to use his own time tried valve as a way to perform the very important function of protection against overspeed, which being the case, the provision of an auxiliary dump valve for control of fast valving which could also function as a redundant means of initiating valve closure in response to overspeed conditions would serve the purposes of fast valving yet could in no way serve to degrade reliability of overspeed protection.

Returning now to FIG. 5, control system 81 is arranged to control the position of valves 73, 77 and 79 through electrical connections shown as dashed lines.

In service use the accumulator containing its normal complement of oil and the piston of the metering cylinder 71 is up against the rod end of the cylinder so that the piston rod is fully extended downward. Also electrically controlled valves 73 and 79 are deenergized and valves 72 and 78 closed.

It is provided that when an event occurs that results in a fast valving signal input to control system 81, valve 79 is energized, which causes valve 78 to open with the effect that the intercept valve closes.

After alowing time for closure to take place, and optionally also ensuring that it did take place by means of a feeler switch which is not shown, the control system energizes valve 73 which causes valve 72 to open whereupon the piston of metering cylinder 71 strokes upward and forces the piston of cylinder 70 to rise part way.

Next after a delay period valve 73 is deenergized which causes valve 72 to close and because oil can slowly drain out of adaptor 76 via its drain connection, the piston of the metering cylinder drops down at a rate governed by the rate of discharge via the drain, which is made low enough so that there is no problem of impact when the piston comes to rest at the end of its stroke, at which stage the valving cycle is complete.

One incidental but not unimportant advantage that the metering cylinder offers relative to decelerating type valve, that may be worthy of note, is that by providing a supplementary push button control that would act to energize electrically controlled valve 73 the metering cylinder can be from time to time stroked under normal load conditions, and by providing the accumulator with a pressure gauge and observing the pressure drop when stroking takes place it could be easily determined whether or not the accumulator contains its normal content of nitrogen and if it did not, provide to add nitrogen.

Because electrically controlled valves 73 and 79 need to be fast acting, use of an alternating current type of solenoid valve would offer advantages, which however would be in part offset by the need to supply power to these valves by means of an inverter which would take its power from a storage battery. One solution to this problem would be to employ a dc solenoid valve having laminated magnetic components as a way to avoid eddy currents which develop in solid type solenoid plungers and slow down valve operation.

Where intercept valves are of plug type as is customary in fossil fuel type turbines it works out that typically 8 to 10 percent stroke will open the valve enough to pass 35 percent of full load steam with reheat pressure at the value that applies at full load, and that around 13 to 15 percent will supply 60 percent, which means that only a relatively small volume of oil is needed when fast partial valve opening is planned, which implies in turn need to employ only a short metering cylinder and a relatively small accumulator. Also because of the small amount of valve stroking needed, where the point applies that GE intercept valves are provided with servo valves, use of a metering cylinder could be dispensed with if servo controlled stroking rate were increased from their present usual value of 10 seconds full stroke to around 2½ seconds full stroke.

Where intercept valves are not provided with means of servo control the metering cylinder approach would appear to provide a relatively simple solution to the problem of limiting extent of high speed reopening.

So far what has been said on the subject of control valve operation has had relation to U.S. units having partial admission type high pressure turbines which also typically do not have provision for rapid enough stroking of valves under servo control to serve effectively as a way to bring about a reduction of high pressure turbine steam acceptance that will serve the needs of fast valving.

In cases where high pressure turbines are not equipped for partial admission and provide fast enough control valve stroking under servo control to sufficiently limit turbine speed under entire loss of load, as applies in the case of Brown Boveri units, rate of valve closure, when fast valving is initiated for purposes of system stability improvement, has turned out to be not too low to afford stability improvement based on the fact that the Brown Boveri units in question have had higher specific inertias then steam-electric units of U.S. manufacture.

With servo control available it is possible to fully or nearly fully close control valves and completely or nearly completely close intercept valves, and to also thereafter reopen both types of valves part way, provided that oil accumulators are made use of as a way to ensure sufficiently rapid valve reopening.

This method of accomplishing fast valving has been provided for in the case of unit No. 2 of TVA's Cumberland station, in which a 1300 MW cross compound Brown Boveri turbine is supplied with steam by a Babcock & Wilcox oncethrough boiler, the general arrangement being as shown in FIG. 2 wherein like identifying numbers have like meanings to identifying numbers of FIG. 1.

Numbers not shown in FIG. 1 comprise primary and secondage superheaters 14 and 15, fly ball type turbine speed sensor 28, superheater by-pass valve 47, with is control unit 48, flash tank 49 and valves 50 which are arranged to open in response to an excess of flash tank pressure.

From the standpoint of fast valving the important feature shown in FIG. 2 is the nature of the superheater by-pass valves provided as an element of the steam generator, which comprises an array of fast acting air operated valves which, when opened, allow steam to flow to the condenser via the flash tank, and which, taken together, have proved to have enough flow capacity to prevent lifting of high pressure safety valves even in the event of a turbine trip-off taking place at full load. (37).

The fact that these valves both offer this much steam acceptance capability, plus the fact that, unlike superheater by-pass valves provided by the two other leading U.S. producers of the power station boilers, they are fast acting, implies that there is no objection to employing full closing of all control valves, and thereafter reopening part way under servo control over a period of up to 10 seconds which represents the time required for control valves of GE electrohydraulic turbine control units to reopen full stroke.

This built in by-pass capability not only affords something in the way of an advantage as regards opportunity for system stability improvement, but, more important, eliminates need to purchase and install power operated relief valves at added cost where provision for fast valving is being made.

When it comes to how to provide so that B & W's superheater by-pass valves are caused to open [when fast valving is involved,] when fast valving is invoked at Cumberland, B & W's initial approach will be to provide so that they open without delay in response to development of a predetermined increase in pressure within the superheater system and reclose progressively as pressure falls.

An alternate approach would be to preprogram a process of valve opening that would be designed to prevent a rise in, or to somewhat reduce pressure, and that would be followed by a process of progressive valve reclosing as pressure dropped below a preset value.

Referring now to FIG. 3, which represents a nuclear steam-electric installation, steam supplied by nuclear steam supply souce (NSSS) 13 which could be of either the pressurized water reactor (PWR) or boiling water reactor (BWR) type flows principally into high pressure turbine 18 while some is diverted to he steam reheat coils located within moisture separator reheater (MSR) 20.

In the figure there is a line from the moisture separator reheater which drains to drain tank 60, from which drain water flows normally through check vlve 61 and drain tank level responsive valve 63 into the low pressure feed water system 3, but can also flow to the condenser through check valve 62 and drain tank level responsive valve 64.

Whereas only one MSR, and only one drain tank 60 and associated valving 61 through 64 is shown, it is to be understood that in actuality there are two MSRs each with its own drain tank and set of associated valves for each low pressure turbine, or in the installation shown in FIG. 3 a total of 6 MSRs, 6 drain tanks and 6 sets of valves.

Steam that passes through the MSRs enters 3 low pressure turbines 24 via 6 pairs of stop and intercept valves 21 and 22 respectively.

In PWRs item 40 represents a high pressure safety valve that discharges steam to atmosphere while in BWRs it represents a safety valve that discharges direct to the suppression chamber of the reactor or the condenser.

Similarly, in the case of PWRs safety valves 45 and 46 are arranged to discharge low pressure steam to atmosphere, and in the case of BWRs to the condenser.

Items 50 represent groups of by-pass valves that are arranged to open in response to excess steam pressure ahead of the turbine, such as can develop when the steam acceptance of high pressure turbine 18 is reduced by closure of control valves 17.

In the case of PWR reactors of Westinghouse type at full load steam delivery pressure falls well below pressure at no load and it results that a sufficiently brief momentary full closure of control valves 17 plus a sustained 50 percent reduction in high pressure turbine steam acceptance will not lift safety valves 40.

On the other hand it is to be understood that if the NSSS is of BWR type, the by-pass capability of valves 50 limits, to the capacity of the by-pass system, the extent of even only momentary reduction in high pressure turbine steam acceptance that can be tolerated without scramming the reactor.

For the above reasons and because by-pass capability is expensive, in the case of those BWRs which do not have 100 percent by-pass capability, which is the usual situation, and assuming partial admission units are involved, it can be essential to rapidly fully close no more than two and in some cases only one control valve.

In the case of nuclear turbines Westinghouse units employ butterfly type intercept valves which have the advantage that in closing they operate to very rapidly reduce low pressure turbine steam acceptance, but the disadvantage that when opened conventionally at a steady rate over a period of 5 seconds reacceptance of steam by the low pressure turbine is delayed for over two seconds which is disadvantageous and therefore it is important to provide via fast closing dump valves, accumulators and metering cylinders or perhaps cam operated decelerating valves so that the valves rapidly reopen part way, as in the range 25 to 50 percent on a flow basis within ½ second after the peak of the generator rotor first forward swing.

How this could be accomplished would differ in detail only from what is shown in FIGS. 4 and 5.

Whereas in the case of both fossil fuel and nuclear steam turbines the desirability of making provision for fast partial reopening of intercept valves has been stressed it could also apply that providing for fast partial reopening of control valves could prove advantageous in situations where it might serve to limit requirements as to need for additional steam by-pass capability.

In the area of problems that could arise in application of fast turbine valving to nuclear steam electric installations the GE has cautioned that fast valving, even of the type that employs only momentary intercept valve closure, could give rise to difficulties in the way of malfunction of moisture separator reheater drain systems due to the mild form of MSR depressurization that takes place when intercept valves reopen after at first initially closing.

To the extent that such a problem exists it would tend to be intensified when control valves are rapidly closed.

However, there is evidence which suggests that, with proper design of MSRs and their drain systems, rapid depressurization has not and in the case of fast valving wll not cause a problem of consequence.

Tests will be needed to clarify this point.

If, following tests, a problem remained that could not be readily solved one solution would be to provide to fully close both the turbine's control and intercept valves and after closure rapidly open them both to a point at which the control valve has reached its preprogrammed new sustained position and the intercept valve has reached an equally open position on a flow basis, and providing thereafter to only slowly fully reopen the intercept valves under servo and/or rate of oil flow control, while in the case of PWR type reactors or at any rate in the case of Westinghouse PWRs this would not involve a need to provide added steam by-pass capability.

On the other hand it would represent a costly approach where BWR reactors were planned for use because it would require providing one hundred percent by-pass capability.

However in the case of BWRs, and for that matter also in the case of PWRs, an alternate approach appears to be feasible, due to the fact that it is claimed that experience to [data] *date* has shown that, presumably due to the cleanliness of the steam and its low discharge velocity, low pressure safety valves of nuclear installations have not leaked following discharge of steam, whether or not they are of the pilot operated type employing teflon O-rings which are widely employed in Westinghouse PWR installations, or of the spring loaded type used by GE in BWR and also in PWR installations.

To the extent that this claim can be relied on as a guide to the future, the point would apply that it is feasible to control turbine driving power in the period following the generator rotor first forward swing, by merely providing to suitably control intercept valve reopening (52) during the entire period during which steam generation within the reactor is being reduced, and rely on discharge of steam through low pressure spring loaded safety valves to limit rise in MSR pressure.

Moreover by providing to lift these valves in response to activation of electrically controlled air operated lift cylinders (51) with the use of pressure switches which could be preprogrammed to provide control only when fast valving has been [involved] *invoked*, the valves could be employed as a way to hold MSR pressure constant during the entire fast valving process, thereby avoiding need for concern as to the behavior of MSR drain systems.

Furthermore it might also prove feasible to extend this concept to fossil fuel installations.

In the fossil fuel case the point would apply that experience has shown that reheat pressure safety valves are less likely to be damaged by discharge of steam than are high pressure types, due presumably to the lower velocity on steam discharge.

Also there is reason to believe that providing to lift safety valves with an air cylinder, rather than merely allowing them to lift on their own in response to increase in steam pressure, also can be expected to minimize damage effects.

Therefore, and especially if steps are taken so that the boiler, superheater and reheater are kept in a clean condition (63) the approach of providing for control of driving power in the period following the generator rotor first forward swing via control of rate of *intercept valve* reopening could represent a workable procedure.

When it comes to how to regulate intercept valve reopening, there would remain the desirability of first rapidly opening the valves part way, and then proceeding more slowly.

When it comes to control of position in the period following initial fast partial reopening, the point applies that it is well within the skill of control system designers to provide, as with the aid of flow control devices, and/or servo systems which could be equipped with a time varying control input that could comprise a motor driven cam that varied the position of a core in a linear differential transformer, so as to effect preprogrammed processes of intercept valve reopening, such that following an initial rapid drop during the period of generator rotor first forward swing, turbine driving power would be restored to a new preprogrammed sustained value, which in the case of fossil fuel installations would preferably be selected to be somewhere in the range of 60 to 90 percent of full load value, but in the case of PWR and BWR nuclear installations, could cover a wider range, since thermal fatigue effects represent a minor factor in the life of nuclear turbines of these types, due to low value of steam temperature.

One point that has so far not been touched on relates to the fact that it is not unusual for steam driven boiler feed pumps to receive their steam from an extraction point of an intermediate pressure turbine, in which case the turbine steam supply from this source is downstream of the intercept valves and will be much reduced, if it does not momentarily disappear, when intercept valves are rapidly fully closed as an aspect of fast turbine valving.

This will result in a process of slowing down of the turbine which will operate to reduce rate of feed water supply more rapidly than the preprogrammed extent of reduction of heat release within the steam generator, but the speed with which this occurs will be governed by the combined specific inertia of the turbine and pump, and, especially if intercept valves are rapidly reopened part way, it has so far appeared to experts in the design of fossil fuel steam generators, that the momentary slowing down that would be experienced would not be consequential as regards effect on the steam generator.

Moreover, in any case, turbines that, at over a predetermined load, accept steam from a point downstream of the intercept valve commonly are provided with means to accept steam either or both from the cold side of the reheaters or the high pressure steam header at light loads.

Normally separate steam chests are provided as a way to allow transfer to one or other of these steam sources and it could readily be provided, and may prove desirable, to effect transfer as a preprogrammed rapidly executed step that would be put into effect in response to a fast valving signal.

Similarly, if in the case of nuclear units, in some cases, boiler feed pump turbines draw steam from a point downstream of the intercept valve, provision can be made to rapidly transfer to the main high pressure steam supply in response to a fast valving signal.

It is believed that the foregoing has served the purpose of showing how it is feasible to preprogram fast valving procedures, involving sustained step reductions in turbine driving power which will well serve the purposes of power system designers when it comes to providing ways to minimize generation station first cost through avoiding need to install redundant circuit breakers, and also as a way to avoid need to construct redundant lines (36).

However to complete the picture it is necessary to provide so that processes of diversion of steam to atmosphere, or to the condenser, that need to be employed as a way to prevent discharge of steam through high pressure safety valves will be terminated without too long a delay.

Actually this is easy enough to accomplish by merely providing to simultaneously rapidly reduce heat release within, and feedwater supply to, the steam generator on a preprogrammed basis, with provision to temporarily override normally utilized feed back type control systems.

Also as matters stand providing this type of control is already well within the skill of designers of steam generator control systems, whether of types that are used in fossil fuel or nuclear steam generators. Thus systems for effecting fossil fuel steam generator runback, to the extent of 50 percent, accomplished in a matter of 30 seconds (61, 62), have been provided by steam generator producers, to handle contingencies such, for example, as a suddenly occurring outage of one of two parallel operating steam turbine driven feed water pumps, while it also appears that, even in coal fired fossil fuel installations, speeding up the process can be carried out so as to provide a 40 percent runback in 10 seconds, although attaining this speed apparently has not proved to be critically needed as a way to avoid development of excess temperature of superheater components (62), and provision for 25 percent runback of BWR nuclear units in a matter of 25 to 50 seconds, and of PWR units in 2 to 4 minutes, is typically feasible.

Based on the foregoing the essential feature of the present invention is viewed as comprising an explanation of how it is possible to provide to rapidly bring into effect preprogrammed control processes directed to effecting sustained partial as well as momentary reduction of turbine driving power, and do so with the use of techniques and equipment that are essentially already available, except to the extent that certain minor changes in equipment for controlling the rapid positioning of turbine valves represent features that are necessary to realization of full potentialities.

Moreover it is easily possible and will generally be useful to provide, within turbine and steam generator control system 39, a plurality of preprogrammed matched turbine and steam generator control processes, and to further provide so that, when an event occurs that sufficiently endangers system stability to require initiation of fast valving, generating station system responsive control system 33 will not only initiate it but will perform, in a preprogrammed way, the function of selecting for initiation one particular pair of control processes from among the available plurality of matched pairs, as for example by sending to control system 39 an input that causes initiation of a sustained reduction of driving power of 10 percent when a fault occurs on line 1, but perhaps one of 20 percent if on line 2, and perhaps one of 40 percent if, as evaluated by what is shown in U.S. Pat. No. 3,657,552, it is expected that both lines will open due to delay in fault clearance, or if one line is already open and the other open, and perhaps also initiate a 40 percent reduction when a fault occurs on line 3.

Also it is possible to provide as per what is shown in U.S. Pat. No. 26,571, so that in case of unsuccessful reclosure on a faulted line, the initially selected pair of control processes are modified in a preprogrammed way, or so that the initially selected pair is modified if reclosure is successful.

TABLE OF REFERENCES

1. S. A. Staege, "Regulator system," U.S. Pat. No. 1,705,688, Issue date Mar. 19, 1929.
2. Buell, R. C., et al, "Governor Performance During System Disturbances," Transactions AIEE, March 1931, Vol. 50, pp. 354–369.
3. S. B. Griscom et al, "Regulator systems," U.S. Pat. No. 1,935,292, Issue date Nov. 14, 1933.
4. S. B. Crary, "Power system stability - volume 11 transient stability," John Wiley & Sons, Inc., New York, pp. 194–197, 1947.
5. Mayer, "Fault initiated control of steam turbines as a means of increasing stability of power systems," Elektrichestvo, No. 13 - 1934, pp. 27–32.
6. Zdanov, "Stability of Electric Power Systems," Gosenergoisdat, 1938, pp. 293–310.
7. V. M. Gornshtein, "Improving the stability of power systems with weak ties by acting on the regulation of steam turbines," Elektrichestvo, No. 5 - 1955, pp. 27–31.
8. Murganov, B. P., "Experimental investigation of regulation of turbine," Teploenergetica, No. 4 - 1957, pp. 9–15.
9. Murganov, B. P., Teploenergetica, No. 6 - 1959.
10. Murganov, B. P., "Regulation of power of turbo-generators in power systems," Teploenergetika, No. 2 - 1961, pp. 9–13.
11. Kashtelan et al, "Response efficiency of excitation systems and the conditions for automatic voltage regulation of large turbo-generators," Elektrichestvo, No. 10 - 1963, pp. 22–31.
12. N. I. Sokolov et al, "An analogue computer study of large turbo generators in parallel operation," Elektrichestvo, No. 10 - 1963, pp. 5–13.
13. V. E. Kashtelan et al, "Increasing stability of electrical systems with help of fast regulation of steam turbines," Elektrichestvo, No. 4 - 1965, pp. 1–8.
14. A. V. Shcheglyaev et al, "Some problems of using steam dumping devices in a steam-turbine unit," Thermal Engineering, vol. 12, No. 1, 1965, pp. 1–9.
15. Y. F. Kosyak et al, "Initial experience of starting and running the prototype KhTGZ K-300–240 Turbine," Thermal Engineering, vol. 12, No. 11, 1965, pp. 1–3.
16. Shubenko-Shubin et al, "The use of desuperheaters in a boiler-turbine unit," Thermal Engineering, 1967, pp. 28–32.
17. V. A. Venikov et al, "Use of fast acting governor control of turbines as a way of improving power system stability," Elektrichestvo, No. 2 - 1967, pp. 13–21.
18. B. P. Moorganov, U.S. Pat. No. 3,421,014, Jan. 7, 1969, "Apparatus for controlling operation of turbogenerator under emergency conditions in the power system."
19. M. A. Berkovich, et al, "Automation for preventing system faults in power pools," paper 34–06, 1970 Session International Conference on Large High Tension Electric Systems (CIGRE).
20. G. A. Doroshenko et al, "Anti-disturbance automation devices for improving power system stability," paper 34–05, 1972 Session International Conference on Large High Tension Electric Systems (CIGRE).
21. R. H. Park, U.S. Pat. No. 3,051,842, Aug. 28, 1962, "Means for maintaining stability of power transmission systems during a fault."
22. R. H. Park, U.S. Pat. No. 3,234,397, Feb. 8, 1966, "Means for maintaining stability of power transmission systems."
23. R. H. Park, U.S. Pat. No. 26,571, of U.S. Pat. No. 3,234,397 mentioned in item 22.

24. F. P. De Mello et al, "Turbine Energy Controls Aid in Power System Performance," Proceedings of the American Power Conference, Volume XXVIII, 1966, pp. 438–445.
25. R. G. Farmer et al, "Four Corners Project Stability Studies," IEEE Conference Paper No. 68 CP 708-PWR, presented at San Francisco, Sept. 15, 1968.
26. Philip G. Brown et al, "Effects of Excitation, Turbine Energy Control, and Transmission on Transient Stability", IEEE Paper No. 70 TP 203-PWR, presented at IEEE Winter Power Meeting, New York, Jan. 25, 1970.
27. D. J. Aanstad, "Dynamic response and data constants for large steam turbines," IEEE Tutorial Course, Course Text 70 M 29 - PWR, pp. 40–49.
28. W. A. Morgan et al, "Modern stability aids for Calvert Cliffs Units," IEEE Transactions on Power Apparatus and Systems, Paper No. 70 TP 147-PWR, Vo. Pas-90, No. 1, Jan/Feb 1971, pp. 1–10.
29. C. Concordia and P. G. Brown, "Effects of trends in large steam turbine driven generator parameters on power system stability," IEEE Paper No. 71 TP 74-PWR, pp. 2211–2218.
30. H. E. Lokay and P. O. Thoits, "Effects of future turbine-generator characteristics on transient stability," IEEE Transactions on Power Apparatus and Systems, Vol. 90/1971, Paper 71 TP 75-PWR, pp. 2427–2435.
31. R. H. Park, U.S. Pat. No. 3,515,893, June 2, 1970, "Method of improving the stability of interconnected power systems."
32. R. H. Park, U.S. Pat. No. 27,842
33. R. H. Park, "Improved reliability of bulk power supply by fast load control," presented at American Power Conference Apr. 24, 1968.
34. cf Ref. 31 - column 19, para. 2
35. W. Trassl, "Safe cycling of high-pressure steam turbines, "Proc. American Power Conf., vol. 31, pp. 306–313, 1969.
36. E. Floyd Thomas et al, "Preliminary operation of TVA's Cumberland Steam Plant," presented at American Power Conference, Chicago, May 1973.
37. O. W. Durrant and R. P. Siegried, "Operation and control of once-through boilers during electric power system emergencies," presented to IEEE Section Meeting, Dallas, Texas, Oct. 21, 1969.
38. Reference 50 of reference 33.
39. P. J. Martin and Ludwig E. Holly, "Bypass stations for better coordination between steam turbine and steam generator operation," Am. Power Con. 5/8/73.
40. Cushing et al, "Fast valving as an aid to power system transient stability and prompt resynchronization and rapid reload after full load rejection," IEEE Paper 71 TP 705-PWR.
41. Reference 24, p. 442, column 1, para. 1.
42. Reference 29, p. 2211, column 2, para. 4.
43. Reference 27, p. 42, column 2, para. 2.
44. R. H. Park, "Fast turbine valving," paper T72 635-1, IEEE Trans on Power Apparatus & Systems, Vol 92 pp. 1065–73
45. Reference 44, p. 1069, column 1.
46. R. H. Park, U.S. Pat. No. 3,657,552, Apr. 18, 1972.
47. R. H. Park, discussion of reference 29, p. 2217, column 1, para. 5.
48. R. H. Park, discussion of reference 40, p. 1635, column 2, para 8.
49. A. C. Sullivan and F. J. Evans, "Some model experiments in fast valving to improve transient stability," IEEE Paper No. C. 72 242-1.
50. Reference 44, p. 1067, column 1, para. 2.
51. Reference 44, p. 1066, column 2, para. 9 and 10.
52. Reference 31, column 19, para. 6.
53. Leon K. Kirchmayer, "Economic Control of Interconnected Systems," John Wiley & Sons, Inc., Publishers, New York, 1959.
54. F. P. De Mello et al, U.S. Pat. No. 3,601,617, Aug. 24, 1971.
55. J. Kure-Jensen, U.S. Pat. No. 3,495,501, Feb. 17, 1970.
56. Reference 44, p. 1066, column 2, para. 3.
57. Reference 44, p. 1068, column 1, para. 11, through column 2, para. 2.
58. Reference 44, p. 1067, column 2, paras. 3, 4, 5.
59. Reference 44, p. 1071, column 2, H. R. Stewart discussion of reference 44, and p. 1071–1073, R. H. Park response.
60. Reference 44, p. 1067, column 1, para. 9 and 10.
61. O. W. Durrant, "Operation and control of once-through boilers during electric power system emergencies," 1970 Proceedings of the ISA, pp. 1–14.
62. F. H. Fenton, Jr., and J. V. Pigford, "Rapid response and maneuverability are obtainable from supercritical plants," 1970 Proceedings of the ISA, pp. 15–26.
63. Reference 44, p. 1069, column 2, para. 3.
64. R. H. Park, "Relay and Control Techniques Used to Activate Fast Steam Turbine Valving for System Stability Improvement" Minutes of Meeting of Relay Committee, May 23–4, 1974, Engineering Section, Pennsylvania Electric Association.
65. K. H. Bieber, "Assured Power Supply With Modern Flexible Generating Units and Bypass Systems Operating At Variable Pressure in A West German Utility System," IEEE Paper No. 71 CP 708-PWR.
66. CIGRE Committee Report, "The Electro-Hydraulic Governing Of Large Steam Turbines," ELECTRA, No. 33, pp. 91, 114.
67. A. J. Smith and George Platt, "A Method for Correcting Turbine-Generator Sudden Load Loss," Instrument Society of America, "Instrumentation in the Power Industry," Vol 14, 1971.
68. R. H. Park, U.S. Pat. No. 3,849,666, Nov. 19, 1974.

Further references cited herein comprise

69. W. Goodbrand and E. D. Holdup, "Recent load rejection testing of large steam generator-turbine generator units and an analysis of a major disturbance on the Ontario Hydro system," presented at the IEEE-ASME Joint Power Generator Conf. Sept. 1971.
70. "Sulzer safety systems for steam generators", Sulzer News no. 1/73, a publication of Sulzer Bros. Boiler and Nuclear Dept., Winterthur, Switzerland.
71. "Steam Conversion in Steam Distributing Systems" Braunkohle, Warme and Energie, Vol. 12, No. 9, Sept. 1960, pp. 438 to 444.
72. Reference 44, page 1069, material under heading "Sudden Partial Loss of Area Export Load."

Referring now to FIG. 6, there is shown therein the steam electric installation of FIG. 1, modified by the inclusion of a by-pass system which is adapted to discharge steam from the hot reheat line 81 to condenser 1, and assumed, also, to incorporate provision for servo control of the position of the turbine's intercept valves, which valves, also, are further assumed to be of a type that is adapted to withstand long duration service in a partially open position.

The by-pass system consists of one or more valves 82 which connect to one or more desuperheaters 83 which in turn connect to the condenser through one or more steam lines 84.

Valve 85 controls supply of water to the desuperheater, received via water line 86, which, as shown, makes connection to the water line that joins boiler feed pump 5 to high pressure feed water heaters 8. However the use of an alternate source of desuperheating water is not excluded.

By-pass control system 87, and desuperheating water flow control unit 88, can comprise equipment of types commonly used in Continental European once through boiler steam electric installations (70,71).

As explained in reference 70, the control system of valves of this type as produced by Sulzer Brothers, when used in fossil fuel installations, causes them to open on a flow modulating basis whenever hot reheat line steam pressure exceeds a first set point which follows continuously and automatically the actual operating pressure, and causes fast full valve opening when reheater pressure exceeds a second set point which also continuously and automatically follows the actual operating pressure, while water flow control unit 88 is arranged to respond to steam temperature downstream of the desuperheater as evaluated with a steam temperature sensor, which is not shown in the drawing.

In the Siemens system desuperheating water is admitted into the valve body itself (71).

In both Sulzer and Siemens systems, as probably in other competing versions, by-pass valves are equipped with hydraulic operators which are capable of ensuring that rise of steam pressure within the hot reheat line is sufficiently restricted to prevent opening of reheat pressure safety valves when the steam acceptance of the low pressure turbine is reduced in a fraction of a second by an amount that does not exceed the flow capacity of the valves.

Apparently, also, the valves of by-pass systems used extensively in Germany, and also rather generally in continental Europe, are not subject to steam leakage in an amount that represents a serious problem, since, per reference 66, practically all thermal power plants in continental Europe are equipped with HP and LP by-pass systems (cf ref. 66 section 5.5 p. 107).

However, in any case, to the extent that leakage should turn out to be a problem it can, if it is serious enough, be corrected by valve maintainance, which can be carried out without scheduling a shutdown if shut off valves are provided on both sides of the valve.

Referring to FIG. 6 when turbine control system 39 receives a fast valving signal that has been generated in fast valving signal generator 33, *it can be provided for that* there will come into effect preprogrammed processes of 1. intercept valve closure which are fast enough and sufficient in extent to have a favorable effect on generator rotor first swing stability, and preferably take the form of full closure effected in ¼ second or less,
2. subsequent reopening of some or all intercept valves to a partially open position with reopening preferably initiated somewhat in advance of the first forward swing of the generator rotor, and carried to completion within a fraction of a second following the peak of that swing, coupled with 3. preprogrammed servo valve implemented retention of partially opened intercept valves in, or substantially in, the preprogrammed position that they attained in their rapidly executed reopening process, with which techniques the intercept valves assume and retain a partially opened position at the end of a preprogrammed repositioning cycle, until such time as an election is made to further reopen them.

With use of a by-pass system that responds to reheat pressure, such as shown in FIG. 6, when the by-pass system will pass, at rated full load hot reheat line pressure, x percent of intermediate pressure steam acceptance at rated full load, it is possible to fully close intercept valves at top speed, in response to a fast valving signal, and partially reopen at or about the instant of generator rotor first forward swing, to a point at which the valves will pass $100-x$ percent of rated full load steam flow, and yet avoid lifting of reheat pressure safety valves.

Thus, in detail, assuming by way of example that $x=50$, and that, as a case in point, the rated full load combined driving power of the intermediate and low pressure turbines is 70 percent of rated load, and taking it as a sufficient approximation that turbine driving power is proportional to steam flow, it would be possible to reduce low pressure turbine driving power, on a sustained basis, by 35 percent of rated full load value, by restricting the extent of intercept valve lifting to 50 percent on a flow basis, and do so without initiating any process of closure of control valves or need to reduce rate of steam generation, or to be concerned about the temperature of the reheater.

Also since pressure ahead of the high pressure turbine will not change, and reheater pressure will change only slightly, total turbine driving power will remain substantially fixed at, $100-35=65$ percent of rated full load value until such time as a decision is made to increase driving power, which can be accomplished by merely further opening the turbine's intercept valves.

There would also be opportunity to close control valves (17), in response to the fast valving signal, at top speed, and fully reopen on a preprogrammed basis, at, or about, or prior to the time of peaking of the first forward swing of the generator rotor, and, if high pressure safety valves are not set too low, their lifting would be avoided, this tending especially to be true if there were available one or more power operated relief valves 42.

At the same time there would be the option of reducing rate of steam generation subsequent to completion of processes of preprogrammed fast valving, whereby to allow partial closure of control valves and more complete opening of intercept valves, as a way to minimize turbine thermal fatigue effects, if it turned out that such effects were great enough to warrant.

Evidently, by choosing $x=60$ turbine driving power could be reduced to $100-0.7\times60$ or 58 percent while with $x=40$ the figure would be 72 percent, and with $x=30$, 79 percent.

Also, to the extent that there was capacity to discharge steam to atmosphere, via valves 42, or through other valves that would discharge to the condenser, or, as in continental European practice, to the cold reheat line (cf refs. 35 and 65), sustained partial control valve closure could be made use of as a way to minimize needed capacity of the low pressure by-pass sytem, and to minimize thermal fatigue effects within the intermediate pressure turbine.

Also, if by-passing of high pressure steam was accomplished with a continental Europen type desuperheating by-pass system that diverted steam from a point ahead of the turbine to the cold reheat line, there would be no requirement to adjust rate of steam generation since the reheater would be prevented from overheating.

Further, although the control scheme just set forth, was illustrated in the context of FIG. 1, it will be readily appreciated that it is equally capable of use as a control system modification that could apply to the steam electric installations of FIGS. 2 and 3, so long as the intercept valves are servo controlled and therefore capable of being held fixed in a partially open position.

In relation to all of the foregoing, it is to be understood that, with the benefit of oil accumulators, fast partial reopening of intercept valves is capable of accomplishment, either with use of high capacity servo valves, or where size of servos is inadequate, with the use either of the metering cylinder system illustrated in FIGS. 4 and 5, or with the aid of cam operated decelerating type valves.

Where, as matters stand, in PWR nuclear steam electric installations, it has become the custom to provide, as a minimum, 45 percent high pressure steam by-pass capability, it would not be necessary to employ a low pressure steam by-pass system, since, as there is no problem of overheating of reheaters, nor, since fast valving would be seldom invoked, any significant problem of thermal fatigue, and since, in a PWR installation, momentary closure of control valves does not induce safety valve lifting, there is also no problem in effecting a combination of preprogrammed fast intercept valve closure followed by partial reopening, coupled with simultaneously executed preprogrammed a. fast full control valve closure followed by fast partial reopening, or
b. merely fast partial control valve closure, which closure process can be so carried out as to limit the extent of rise in MSR pressure, and avoid operation of safety valves.

When it comes to either PWR or BWR type nuclear installations, there is an advantage in avoiding reduction of MSR pressure with a view to eliminating hazard of instability of MSR drain systems.

Thus referring to FIG. 3, to achieve this result in a PWR installation, care would be taken that the process of control valve repositioning would be so programmed that up to the point that the intercept valves [(22)] *22* had reached their preprogrammed final sustained partially open position, the supply of steam to the moisture separator reheater [(20)] *20* would exceed the amount leaving it, with the net effect that MSR pressure would at first rise rather than fall.

However, at the same time, control valves [(17)] *17* would preferably be fully closed and partly reopened, at somewhat less speed than would apply to the intercept valves [(22)] *22*, as a way to minimize the extent of MSR pressure rise that takes place up to the point of stabilization of the turbine's intercept valves in their preprogrammed partially reopened position.

Also the option would be available of providing the turbine's control system with an MSR pressure input which input would be arranged so as to cause the control system to hold MSR pressure constant.

As previously noted, in the case of BWR type installations, it is desirable to dispense with preprogrammed control valve closure, in view of the fact that reduction of high pressure turbine steam acceptance operates to increase reactor pressure, which, if occurring rapidly, other than in small amount, will cause reactor scram.

Further, it is desirable to minimize MSR pressure changes, not only to avoid MSR drain system transients, but also to avoid inducing changes in high pressure turbine steam acceptance.

Therefore the desirability of making use of a servo controlled low pressure by-pass system that responds to rise in MSR pressure is indicated.

In [BNR] *BWR* installations holding control valve position constant would have the effect that reduction of high pressure turbine steam acceptance would be confined to that induced by increase in pressure ahead of the low pressure turbine, which would be held small by the low pressure by-pass system, while, also such decrease in high pressure turbine steam acceptance as would be experienced, would be dealt with through the working of the reactor's steam pressure rise responsive feed back type control system, which regulates the position of by-pass valves that discharge high pressure steam to the condenser, and which automatically comes into play when high pressure turbine steam acceptance decreases, and operates successfully to prevent reactor scram if rate and extent of pressure change is not excessive.

While the low pressure by-pass control system shown in FIG. 6 offers the advantage that it holds pressure ahead of intercept valves constant, independent of the extent of preprogrammed, or subsequent further, valve reopening, the point applies that, in the case of fossil fuel and HTGR nuclear installations, it would also be possible to dispense with the modulating aspect of the system, and arrange merely to fully open valve or valves 82 when fast valving is [involved,] *invoked*, and to provide so that the capacity of the valves was suitably coordinated with the preprogrammed extent of intercept valve partial reopening, or vice versa, in such manner as to hold hot reheat line pressure constant or cause it to somewhat decrease.

If there were several valves 82 there could be election to open a variable number of them, and in any given case, provide for coordination of extent of preprogrammed intercept valve reopening.

It would be also possible to utilize as by-pass valves 82 air lifted spring loaded valves that would preferably be equipped with shutoff valves on either side to avoid need for a unit shut down when maintenance was required.

Shut-off valves can advantageously be of the gate type while the valve that stands between the by-pass valve and the hot reheat line would preferably be provided with a split gate having a connection through the valve body to the space between the two halves of the split gate, which feature offers the advantage that it makes possible entire prevention of leakage of steam through the valve during maintenance periods, by, in such periods, employing the expedient of pressurizing the space between the gates with high pressure nitrogen.

In another approach to controlling reheat line pressure it would be possible to arrange to open and close some of reheat pressure valves 82 in response to steam pressure, whereby to employ the valves in question to effect on-off type pressure control.

Where reference has been made to increase in hot reheat line and MSR pressure when fast valving is invoked, and a low-pressure by-pass system is employed that is arranged to modulate on a feed back basis in response to pressure ahead of the system, or if resort is had to the on-off type control, the point applies that control action is not required until fast valving is initiated, which means that the set points of the controls can be made such as to minimize pressure rise when the by-pass system comes into effect in response to a fast valving signal.

Where, as in FIG. 3, PWR and BWR nuclear installations incorporate three low pressure turbines it is possible, as an alternate to fast closure and partial reopening of all intercept valves (22), to first close all valves, but fast reopen the valves of two low pressure turbines while retaining the valves of the third unit in closed position.

This technique would offer the advantage of allowing [extension of] application of the practice of sustained reduction of driving power of low pressure turbines of Westinghouse manufacture used in PWR and BWR nuclear installations, in which servo valve control of intercept valves are not provided.

Also, when, as in the case of GE turbines, there has been, or would be, objection to employing fast closure of intercept valves of PWR and BWR nuclear installation turbines, where this would be followed by fast reopening against full MSR pressure, it would be feasible, instead to provide for fast closing, and subsequently to hold closed the intercept valves of one unit while, where needed, bringing about improvement of generator rotor first swing, or first and second swing stability with the benefit of a braking resistor.

This would leave the problem of how to proceed to reopen the valves of the unit that was valved down. However, this could be handled by partly unloading the turbine, as during nighttime system light load operation, at which point there would be no harm in initiating the reopening process.

Also the above procedures could be extended to fast valving down three low pressure units and restoring power to only one, or to fast valving down and holding two units in unloaded condition, and the concepts involved could also be utilized when there were two instead of three low pressure turbines, or if there should ever be as many as four or more.

There are thus several ways and techniques of implementing the present invention, preferred forms of which vary in some degree in dependence on the type of turbine steam supply source as well as on the nature of the turbine and its control system.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

In addition it could be in order to note that the point applies that concepts of the present invention can be usefully applied as ways to implement processes of fast valving for the purpose of reducing the extent of turbine overspeeding in the event of partial loss of load, such as can occur in the event of a system breakup that causes system electrical islands to form which contain turbine driven generators, and in which the islanding process has resulted in a loss of islanded area load, either at once, or as a result of the influence of load shedding internal to the area (72).

CLAIM TERMINOLOGY

The basic approach to improvement of power system stability that underlies what is set forth in the present application is to provide and utilize means of responding to suddenly occurring events that jeopardize power system stability by sufficiently rapidly reducing the driving power of at least one power system generator prime mover.

To accomplish this result delay in initiating valve closure and time to close, once closure is begun, are preferably made such that valves close fully in ¼ second or less.

Going back into history, in the Staege patent (1) wording of claim 2 is "2. In a power-transmission system, a power circuit, a generator connected to said power circuit, a prime mover for driving said generator, and means for increasing the stability of said transmission system comprising means operative upon abnormal power-circuit current for reducing the flow of motive fluid to said prime mover."

Subsequently in the Criscom and Wagner patent (3) in claim 5 the statement is

"5. In a transmission system, a synchronous generator, a transmission line connected thereto, said line having a fault-responsive sectionalizing means, a prime-mover for supplying mechanical power to said generator, and electric fault-responsive means for temporarily altering the available generator-turning power delivered to said generator within a time which is small in comparison to the half-period of oscillation of the system, the direction of alteration being such as to reduce said oscillation."

In the case of the Staege patent the disclosure calls for restoring driving power to its predisturbance value after a "predetermined time."

In the case of the Griscom and Wagner patent both the disclosure and all claims that relate to driving power reduction refer to "temporarily" altering or reducing it or words to that general effect.

In 1929 and 30, at the writer's suggestion, the GE Co. carried out tests on a 50,000 kw reheat type turbine generator which demonstrated the feasibility of employing very rapid momentary reduction of turbine driving power as a way to improve power system stability (2).

When the writer first filed the patent application that led in due course to U.S. Pat. No. 3,051,842, he at first gave consideration only to new ways to make use of application of an artificial or braking load and fast momentary reduction of turbine driving power (cf claims 1 through 15), but before the patent issued he modified it to also include essentially what is covered in claim 2 of Griscomb and Wagner with the added provision that ". . . the fault is caused to effect a modification of generator prime mover driving power characteristics whereby it results that following clearance of the fault and return to steady power flow conditions the amount of power transmitted over the transmission system from the generating segment to the receiving segment is reduced relative to conditions obtaining just prior to the fault." (cf column 3 lines 1 through 8).

What the writer had added was the very important concept of effecting a driving power reduction that was not merely rapid enough to favorably effect power system stability during the first forward swing of the generator rotor following a line fault, which is to say within the first half-period of oscillation of the system, as in Griscom and Wagner, but that also operated to hold driving power in the post fault period below its prefault value.

What Staege, and Griscom and Wagner, proposed was basically new, and what the writer added was a basically new improvement over what they disclosed and claimed.

However when the writer was in process of writing the claims of U.S. Pat. No. 3,051,842 he had not seen either the Staege, or Griscom and Wagner patents, and did not find himself equal to the task of writing the kind of brief strong claims that those patents incorporated, and above all he was unable to argue successfully with the then examiner that it would not, in the light of the prior art of turbine control, be obvious to anyone skilled in the combined arts of power transmission and turbine control to provide to restrict the extent of preprogrammed return of driving power to prefault value during the post fault period.

However as experience well demonstrated, it was not, in fact, obvious, nor, as brought out in the petition to allow a reissue of the writer's second patent, was it obvious that, as proposed in that patent, there are special advantages in combined employment of fast [value] *valve* action of the sustained reduction of driving power type, and mometary application of a braking load.

What has been at stake is that the writer proposed two entirely new techniques of improving power system stability, which can be briefly characterized as a. sustained reduction of driving power type fast valving, or more simply "sustained type fast valving" and
b. the combination of sustained type fast valving and braking, which, from the start offered an important potential to allow either improving reliability of bulk power transmission, or minimizing need to construct power transmission lines.

However it turned out to be very difficult to evoke interest in these concepts because of what the writer has termed "the power technology education gap," which relates to the fact that, almost without fail, mechanical engineers do not understand what determines power system stability, and electrical engineers usually know relatively little about steam turbines and steam generators.

Knowledge in these areas has tended to be closely compartmented, this being somewhat more true in the U.S. than on the continent of Europe, where turbine producers have tended to produce boilers as well.

As the writer began to work toward the implementation of his concept of use of very rapidly effected sustained type reduction of turbine driving power as a means of improvement of system stability, he encountered the situation that, whereas power transmission system planners could be easily convinced of the merit of what he proposed as a way to improve stability and minimize need to build lines, turbine and boiler people raised objections which, in time sequence, were to the effects that what was proposed would A. cause lifting of and damage to safety valves,
B. cause objectionable thermal fatigue effects,
C. require changes to turbine control systems,
D. cause objectionable steam generator transients,
E. cause
  1. greater control complexity,
  2. additional duty on intercept valves,
  3. more severe duty on intercept valves,
  4. burden of drain system instability,
  5. certain blowing of MSR pressure relief valves, item E above representing the recently stated position of the GE Co's turbine people as regards fast valving generally, whether of the momentary or sustained reduction of driving power type.

Because of these objections it became necessary to find remedies.

Also, as time went on, refinements were added, such as provision to at first employ momentary fast valving, but, in certain situations, within a fraction of a second, convert to sustained type (46) or vice versa (68), and also to alter the extent of preprogrammed sustained driving power reduction with a fraction of a second of initiation of fast valving.

The present application deals with a particular set of ways of avoiding adverse effects on safety valves, turbine valves, and steam generators when fast valving of the sustained reduction of driving power type is made use of as a way to preserve system stability when threatened by events such as, but not limited to, line faults, when the event could operate to cause instability.

Therefore it depends on use of the basically new concept of responding to suddenly occurring events that could adversely affect power system stability by doing things that initiate a sustained type reduction of turbine driving power that is adapted to take place fast enough to serve the purpose of helping to prevent development of system instability.

When it comes to the hardware, naturally each turbine producer prefers to utilize the hardware that he already has developed and is supplying.

In the U.S., GE and Westinghouse use valve actuator oil dump valves to effect very rapid valve closure, and these dump valves have to be closed before reopening can begin.

GE's dump valves reclose much more slowly than those of Westinghouse, but this is merely objectionable and not necessarily fatal to success especially when braking is utilized.

Continental European turbines, or at least those of the Brown Boveri Co., use large servo valves as a way to cause fast valve closure.

Westinghouse large nuclear turbines are especially in need of provision to rapidly reopen their butterfly type valves and, at the instance of the TVA, Westinghouse is currently in process of providing for fast opening.

To attain desirable speeds of opening, oil pumps such as are normally employed to supply oil for valve reopening purposes, have to be supplemented by oil accumulators.

Also, in order to add the useful feature of fast partial reopening of intercept valves, if large enough servo valves are not available, they must be provided, or otherwise cam operated decelerating valves or metering cylinders as described in this application can be used.

Also where intercept valves require to be held in a partly open position on a sustained basis, ability to so operate without valve damage is required.

The details of how these things can be done, and are being done in the case of TVA steam-electric installations, are unimportant because there are many ways to proceed and each turbine control system designer and each valve designer is free to use whatever approach in his opinion suits best in his case.

In the course of conversations with the key turbine control and valve designers of GE, Westinghouse, and Brown Boveri, except when it came to provision for fast opening of large valves of nuclear turbines against full MSR pressure, there has never been any question as to the feasibility of providing features that the writer has called for if only a. there is a genuine economic advantage in their use,
b. adverse effects contingent on their use can be avoided.

With this in mind, and to render the claims easy to read, it has appeared advantageous to employ a claim wording that does not go into detail when it comes to what in the prior art is available and would be made use of.

Griscom and Wagner patent claim number 5 used the terms

". . . means for temporarily altering the available generator-turning power delivered to said generator within a time which is small in comparison to the half-period of oscillation of the system . . . "

In the context of the present application this wording could be paraphrased to read as below —means for effecting a sustained reduction of the driving power of the turbine within a time period which is small in comparison with the half period of oscillation of the system—

However this phraseology would be too narrow a. first because ordinarily it would be desirable for driving power to sustain at approximately the value that would be arrived at at the end of the half period of oscillation and
b. second because as brought out in references 23, 46, and 68 there are exceptions to the rule.

Thus what needs to be done varies from situation to situation, while also as brought out in references 23, 31, and 32, it can be advantageous to boost rather than reduce driving power.

In general there are several situations in which it is useful to reposition turbine valves as rapidly as possible, and it follows that there can be an advantage in providing a common way to characterize this type of valve action.

To have a simple terminology the words fast turbine valving have seemed best to fit the bill (64).

Historically the first, and still the most important, purpose of fast valving has been to minimize development of overspeed, on full or partial loss of load, by rapidly closing valves.

Also there has always been, and remains, a need to prevent too great a drop in speed when load suddenly increases, by providing to rapidly open valves.

However, as a new development, fast turbine valving can also be used as a way to avoid development of system instability as a consequence of stability endangering events, and when so used can be employed in two ways, as below, a. to reduce turbine driving power by closing valves, in the case of development of stability endangering events of a type adapted to cause a generator to experience a sudden at least momentary reduction of load,
b. to increase turbine driving power by opening valves in the case of events of a type adapted to cause a generator to experience a sudden increase in load while those skilled in the art of turbine control know how this can be done, by providing within the turbine's control system for a predetermined response to a fast valving signal input which response will comprise a preprogrammed process of valve repositioning.

Now, in the above, it is to be understood that a turbine's control system can incorporate more than one preprogrammed process of fast valving in response to a fast valving signal, as is well brought out in reference 54, which comprises GE U.S. Pat. No. 3,601,617, and in which provision is made to effect fast valving, both a. for overspeed protection, and
b. for improvement in system stability, with valve behavior dependent on which of two types of fast valving signals has been generated, program (a) being made responsive to a fast valving signal generated as a result of a sudden full or partial loss of station load not involving a line fault, and program (b) being made responsive to the occurrence of a fault.

Also, as brought out in the writer's various patents and publications that deal with fast valving for stability improvement, the nature of the preprogrammmed valving cycle can be automatically varied in dependence on such factors as prefault transmitted load (21), the occurrence or non-occurrence of a refault after reclosure of faulted line circuit breakers (22, 23), the trip-off of generators, and the opening of intersystem ties (31, 32), the development of delay in fault clearance (46, 68), and the type and location of line faults (44, 64), and that in these connections it can be desirable to provide, as described in reference 64 and 68, so that when a fast valving signal is generated in response to a system stability endangering event the signal is made available, selectively, as an input to one of a group of two or more turbine control system fast valving signal input channels, each of which, when a signal is received, activates a different portion of the turbine's control system, and brings into effect a different type of preprogrammed fast valving cycle.

Whereas not made explicit in the claims it is to be understood that normally, as shown in the figures, the power delivered by alternating current generators is stepped up in voltage by generator transformers, and delivered via circuit breakers, supplied to transmission systems which serve to interconnect the generator with other generators, while also the point will apply that large steam turbines of compound type invariably receive their steam from steam generators.

Where, as in some cases, direct current lines or ac-dc-ac back to back converters are made use of, advantage in fast valving for stability improvement can fail to apply, but this will not be the case where the turbine generator that would be fast valved is united to other generators by a plurality of alternating current transmission circuits.

Where in the above, and in the claims, use is made of the word preprogrammed, what is to be understood is that where valve repositioning is involved, on energization of some sort of trigger device, spring loaded valves will close in a manner that will be entirely determined by the design of the valves, springs, and valve actuator oil discharge means.

Also, it will be provided in advance that the reopening process will begin at a preset point in time following the end of the closing process.

Further there will be advance provision that will determine the nature of the stroke of the valve versus time, during the opening process.

It will also be understood that a preprogrammed process of signal generation and control system fast valving input signal channel selection implies advance determination of what will take place.

The word sustained is used in the claims in the context of a preprogrammed process of sustained type partial intercept valve reopening and is to be understood to mean that the valve ends up in a partially open position, and will remain there unless and until something that was not preprogrammed takes place.

In this section on claim terminology, words and phrases that have been underlined represent, in a sense, a special language that has proved to be useful when dealing with fast turbine valving for stability improvement, an area of expertise for which, until recently, there was no need of specialized language development.

Based on the foregoing what I claim is:

1. In a power system which includes a plurality of prime mover driven generators, which are interconnected by a plurality of alternating current transmission circuits, and which include at least one generator that is driven by a compound type steam turbine incorporating control valves ahead of the high pressure turbine, and intercept valves ahead of the turbine or turbines that are driven by steam that is discharged by the high pressure turbine, the method of fast valving of the said compound turbine, as a way to avoid development of system instability, which comprises the steps of 1. providing within the turbine's control system for a predetermined response to a fast valving signal input which response will bring into effect preprogrammed processes of,
   a. at least partial closure of the turbine's intercept valves, *effected fast enough to have a favorable effect on generator rotor first swing stability,*
   b. sustained type partial intercept valve reopening.
2. providing in a preprogrammed manner so that,
   a. a fast valving signal is generated on the occurrence of *certain types of* system stability endangering events [of a type] that cause the said generator to experience a sudden at least momentary reduction of load,
   b. the said fast valving signal is made available as an input to that portion of the turbine's control system that is adapted to bring into effect the said predetermined response.

2. The process of claim 1 in which intercept valve reopening is initiated within 0.1 second of completion of the closing process.

3. The process of claim 1 which partial intercept valve reopening carried out in step (1-b) is effected with oil supplied from accumulators, and is terminated by operation of valves of cam operated type, with cam position determined by valve stroke.

4. The process of claim 1 in which fast partial intercept valve reopening, carried out in step (1-b)is effected by the transfer to the cylinder of each of the valve actuators, of a predetermined quantity of oil contained within a second cylinder.

5. The process of claim 1, but supplemented by provision of preprogrammed fast valving signal initiated control valve repositioning, accomplished rapidly enough, and sufficient in extent, to prevent an increase of steam pressure ahead of the turbine's intercept valves that if not prevented, would suffice to cause discharge of steam through safety valves located ahead of said intercept valves.

6. The process of claim 1 but supplemented by providing so that receipt by the turbine's control system of a fast valving signal input causes discharge of steam to the condenser through *one or more* steam flow control means which are arranged to receive steam from a point *down stream of the high pressure turbine, but* ahead of the turbine's intercept valves.

7. In a power system which includes a plurality of prime mover driven generators, which are interconnected by a plurality of alternating current transmission circuits, and which include at least one generator that is driven by a nuclear type compound steamm turbine incorporating control valves ahead of the high pressure turbine, and intercept valves ahead of the turbine or turbines that are driven by steam that is discharged by the high pressure turbine, the method of fast valving of the said compound turbine, as a way to avoid development of system instability, which comprises the steps of 1. providing within the turbine's control system for a predetermined response to a fast valving signal input which response will bring into effect preprogrammed process of,
   a. at least partial closure of the turbine's intercept valves, [,] *effected fast enough to have a favorable effect on generator rotor first swing stability,*
   b. sustained type partial intercept valve reopening,
   c. control valve repositioning of the at least partial closure type followed by partial reopening so programmed that, to whatever extent practicable, the time variation of flow of the steam in the steam and water mixture that enters the separator conforms to the time variation of steam flow out of the separator, whereby to minimize change in pressure of steam within the separator,
2. providing in a preprogrammed manner so that,
   a. a fast valving signal is generated on the occurrence *of certain types* of system stability endangering events [of a type] that cause the said generator to experience a sudden at [lease] *least* momentary reduction of load,
   b. the said fast valving signal is made available as an input to that portion of the turbine's control system that is adapted to bring into effect the said predetermined response.

8. The process of claim 7, but supplemented by provision so that receipt by the turbine control system of a fast valving signal input initiates a preprogrammed process of reduction of rate of steam production within the steam generator.

9. In a power system which includes a plurality of prime mover driven generators, which are interconnected by a plurality of alternating current transmission circuits, and which include at least one generator that is driven by a compound type steam turbine incorporating control valves ahead of the high pressure turbine, and in which steam discharged from a high pressure turbine passes into two or more low pressure turbines, each of which is equipped with a complement of intercept valves, which, when closed, prevent access of steam to the turbine to which they connect, the method of fast valving of said compound turbine, as a way to avoid development of system instability, which comprises the steps of 1. providing within the turbine's control system for a predetermined response to a fast valving signal input which response will bring into effect preprogrammed processes of,
   a. at least partial closure of the intercept valves of all of the installation's low pressure turbine, *effected fast enough to have a favorable effect on generator rotor first swing stability,*
   b. thereafter, holding in closed position the intercept valves of at least one but not all of the said low pressure turbines, while fully opening the intercept valves of the balance of the installation's low pressure turbines
2. providing in a preprogrammed manner so that,
   a. a fast valving signal is generated on the occurrence *of certain types* of system stability endangering events [of a type] that cause the said generator to experience a sudden at least momentary reduction of load,
   b. the said fast valving signal is made available as an input to that portion of the turbine's control system that is adapted to bring into effect the said predetermined response.

10. The process of claim 9, but supplemented by provision of preprogrammed fast valving signal initiated control valve repositioning, accomplished rapidly enough, and sufficient in extent, to prevent an increase of steam pressure ahead of the turbine's intercept valves that, if not prevented, would suffice to cause discharge of steam through safety valves located ahead of said intercept valves.

11. The process of claim 9 but supplemented by providing so that receipt by the turbine's control system of a fast valving signal input causes discharge of steam to the condenser through steam flow control means which are arranged to receive steam from a point *down stream of the high pressure turbine, but* ahead of the turbine's intercept valves.

12. In a power system which includes a plurality of prime mover driven generators, which are interconnected by a plurality of alternating current transmission circuits, and which include at least one generator that is driven by a compound type steam turbine incorporating control valves ahead of the high pressure turbine, and in which steam discharged from a high pressure turbine passes into two or more low pressure turbines, each of which is equipped with a complement of intercept valves, which, when closed, prevent access of steam to the turbine to which they connect, the method of fast valving of the said compound turbine, as a way to avoid development of system instability, which comprises the steps of 1. providing within the installation's turbine control system for a predetermined response to a fast valving signal input which response will bring into effect a preprogrammed process of full closure of the intercept valves of at least one, but not all, of the installation's low pressure turbines, while retaining the intercept valves of the balance of the installation's turbines in full open position,
2. providing in a preprogrammed manner so that,
   a. fast valving signal is generated on the occurrence *of certain types* of system stability endangering events [of a type] that cause the said generator to experience a sudden at least momentary reduction of load,
   b. the said fast valving signal is made available as an input to that portion of the turbine's control system that is adapted to bring into effect the said predetermined response.

13. The process of claim 12, but supplemented by provision of preprogrammed fast valving signal initiated control valve repositioning, accomplished rapidly enough, and sufficient in extent, to prevent an increase of steam pressure ahead of the turbine's intercept valves that, if not prevented, would suffice to cause discharge of steam through safety valves located ahead of said intercept valves.

14. The process of claim 12, but supplemented by providing so that receipt by the turbine's control system of a fast valving signal input causes discharge of steam to the condenser through steam flow control means which are arranged to receive steam from a point *down stream of the high pressure turbine, but* ahead of the turbine's intercept valves.

* * * * *